United States Patent
Kondo et al.

(10) Patent No.: US 7,821,572 B2
(45) Date of Patent: Oct. 26, 2010

(54) APPARATUS AND METHOD FOR PROCESSING INFORMATION SIGNAL, APPARATUS AND METHOD FOR PRODUCING COEFFICIENT, APPARATUS AND METHOD FOR PRODUCING LOOKUP TABLE, PROGRAM FOR PERFORMING EACH METHOD, AND MEDIUM RECORDING EACH PROGRAM

(75) Inventors: Tetsujiro Kondo, Tokyo (JP); Takashi Nakanishi, Tokyo (JP); Daisuke Kikuchi, Tokyo (JP); Shizuo Chikaoka, Tokyo (JP); Takeshi Miyai, Tokyo (JP); Yoshiaki Nakamura, Tokyo (JP); Tsugihiko Haga, Kanagawa (JP)

(73) Assignee: Sony Corporation, Tokyo (JP)

( * ) Notice: Subject to any disclaimer, the term of this patent is extended or adjusted under 35 U.S.C. 154(b) by 1359 days.

(21) Appl. No.: 10/559,491

(22) PCT Filed: Jun. 4, 2004

(86) PCT No.: PCT/JP2004/007814

§ 371 (c)(1),
(2), (4) Date: Dec. 5, 2005

(87) PCT Pub. No.: WO2004/110063

PCT Pub. Date: Dec. 16, 2004

(65) Prior Publication Data

US 2006/0133696 A1 Jun. 22, 2006

(30) Foreign Application Priority Data

Jun. 6, 2003 (JP) .............................. 2003-162228

(51) Int. Cl.
*H04N 7/01* (2006.01)
*H04N 11/20* (2006.01)

(52) U.S. Cl. .................. 348/445; 348/441; 348/459
(58) Field of Classification Search ................. 348/441, 348/445, 458
See application file for complete search history.

(56) References Cited

U.S. PATENT DOCUMENTS 5,517,588 A 5/1996 Kondo (Continued)

FOREIGN PATENT DOCUMENTS

EP 1 001 371 5/2000

(Continued)

*Primary Examiner*—Brian P Yenke
(74) *Attorney, Agent, or Firm*—Frommer Lawrence & Haug LLP; William S. Frommer; Thomas F. Presson

(57) ABSTRACT

This invention relates to an apparatus for processing an information signal etc. that, when converting, for example, SD signal into HD signal, enables well to be obtained pixel data of HD signal no matter whether the dynamic range DR is large or small. DR in a class tap is detected. If DR≧Th, items of pixel data $y_{1-a}$–$y_{4-a}$ calculated by using item of coefficient data $W_{i-a}$ corresponding to a class code Ca are estimated as items of pixel data of HD signal. If DR<Th, an addition mean value of items of pixel data $y_{1-a}$–$y_{4-a}$, $y_{1-b}$–$y_{4-b}$ calculated by using items of coefficient data $W_{i-a}$, $W_{i-b}$ corresponding to class codes Ca, Cb is estimated as item of the pixel data of HD signal. The items of coefficient data Wi-a, Wi-b are obtained by learning between a student signal corresponding to the SD signal and a teacher signal corresponding to the HD signal by using a portion of the DR having a value thereof that is not less than the threshold value Th. The code Ca is converted into the code Cb so that the addition mean value can most approach a true value of the pixel data of the HD signal.

9 Claims, 17 Drawing Sheets

U.S. PATENT DOCUMENTS

| | | |
|---|---|---|
| 5,666,164 A | 9/1997 | Kondo et al. |
| 5,852,470 A | 12/1998 | Kondo et al. |
| 6,057,885 A | 5/2000 | Horishi et al. |
| 7,630,576 B2* | 12/2009 | Kondo ........................ 382/276 |
| 2003/0011707 A1* | 1/2003 | Kondo et al. ................ 348/441 |
| 2003/0063216 A1* | 4/2003 | Kondo et al. ................ 348/441 |
| 2003/0133040 A1 | 7/2003 | Konodo et al. |
| 2003/0164896 A1* | 9/2003 | Kondo et al. ................ 348/441 |
| 2005/0013508 A1* | 1/2005 | Kondo et al. ................ 382/300 |
| 2005/0128493 A1* | 6/2005 | Nemoto et al. ............... 358/1.2 |
| 2005/0140824 A1* | 6/2005 | Kondo et al. ................ 348/441 |
| 2005/0226537 A1* | 10/2005 | Kondo et al. ................ 382/298 |
| 2005/0238247 A1* | 10/2005 | Kondo et al. ................ 382/254 |
| 2005/0270416 A1* | 12/2005 | Kondo et al. ................ 348/441 |
| 2006/0028581 A1* | 2/2006 | Kondo et al. ................ 348/458 |
| 2006/0038920 A1* | 2/2006 | Kondo et al. ................ 348/561 |
| 2006/0095603 A1* | 5/2006 | Kondo et al. ................. 710/16 |
| 2006/0110051 A1* | 5/2006 | Kondo et al. ................ 382/232 |
| 2007/0047830 A1* | 3/2007 | Kondo ........................ 382/240 |
| 2007/0098269 A1* | 5/2007 | Kondo et al. ................ 382/224 |
| 2007/0216802 A1* | 9/2007 | Kondo et al. ................ 348/452 |
| 2008/0199072 A1* | 8/2008 | Kondo et al. ................ 382/155 |
| 2008/0240599 A1* | 10/2008 | Kondo et al. ................ 382/254 |

FOREIGN PATENT DOCUMENTS

| | | |
|---|---|---|
| EP | 1 331 817 | 7/2003 |
| JP | 5-328185 | 12/1993 |
| JP | 7-95591 | 4/1995 |
| JP | 8-51622 | 2/1996 |
| JP | 8-79712 | 3/1996 |
| JP | 10-136317 | 5/1998 |
| JP | 2000-59740 | 2/2000 |
| WO | WO 0241631 | 5/2002 |

* cited by examiner

| INPUT CLASS CODE Ca | OUTPUT CLASS CODE Cb |
| --- | --- |
| 1 | 1 2 5 |
| 2 | 1 1 8 |
| 3 | 5 5 |
| ⋮ | ⋮ |
| p | q |
| ⋮ | ⋮ |

FIG. 8

| OUTPUT CLASS | | INPUT CLASS | | | | | | | |
|---|---|---|---|---|---|---|---|---|---|
| | | 1 | 2 | 3 | 4 | .... | p | .. | N |
| | 1 | | | | | | +E1 | | |
| | 2 | | | | | .... | +E2 | | |
| | 3 | | | | | | +E3 | | |
| | 4 | | | | | .... | +E4 | | |
| | · | | | | | | +E5 | | · |
| | · | | | | | | | | · |
| | q | | | | | | +Eq | | |
| | · | | | | | | · | | · |
| | N | | | | | .... | +EN | .. | |

FIG. 9

| OUTPUT CLASS | | INPUT CLASS | | | | | | | |
|---|---|---|---|---|---|---|---|---|---|
| | | 1 | 2 | 3 | 4 | .... | p | .. | N |
| | 1 | | | | | | 100 | | |
| | 2 | | | | | .... | 256 | | |
| | 3 | | | | | | 1000 | | |
| | 4 | | | | | .... | 50 | | |
| | · | | | | | | 500 | | · |
| | · | | | | | | 128 | | · |
| | q | | | | | | 25 | | |
| | · | | | | | | · | | · |
| | N | | | | | .... | 36 | .. | |

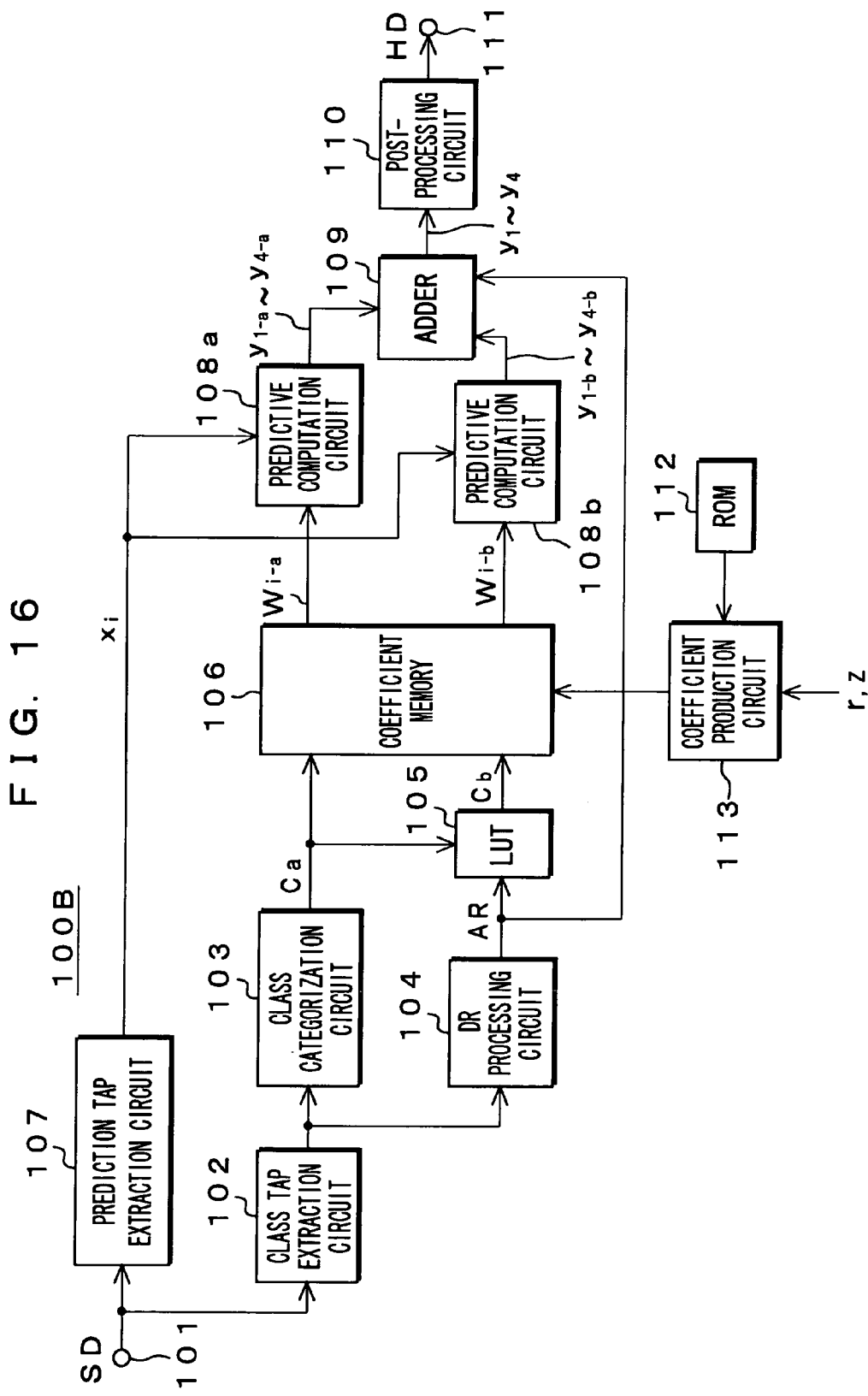

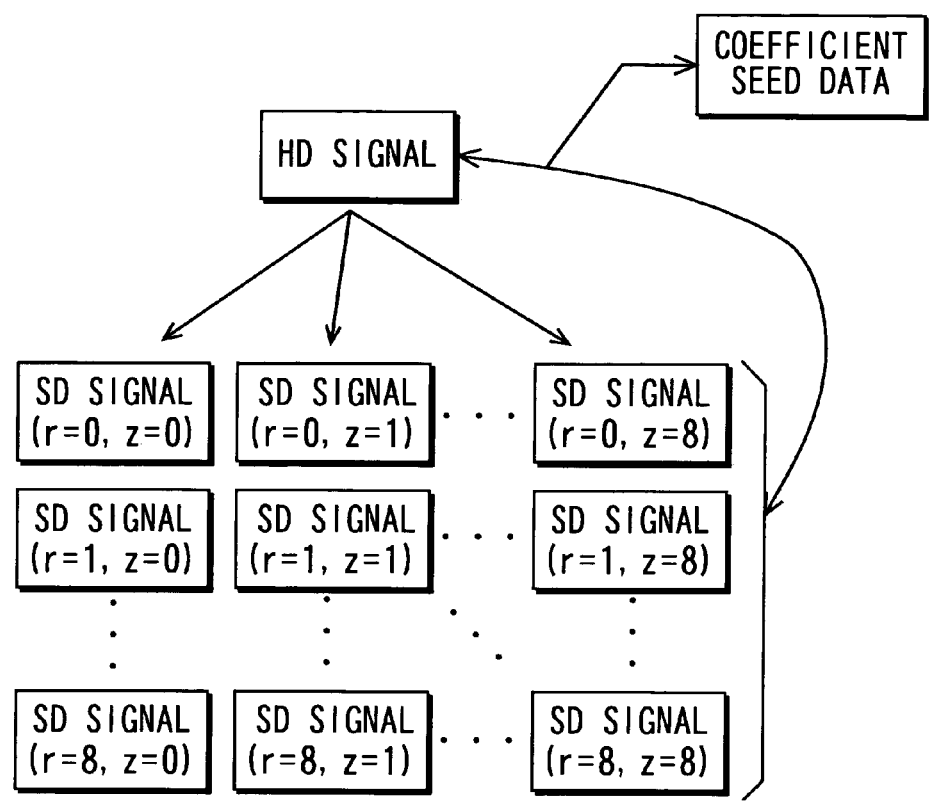
F I G. 1 7

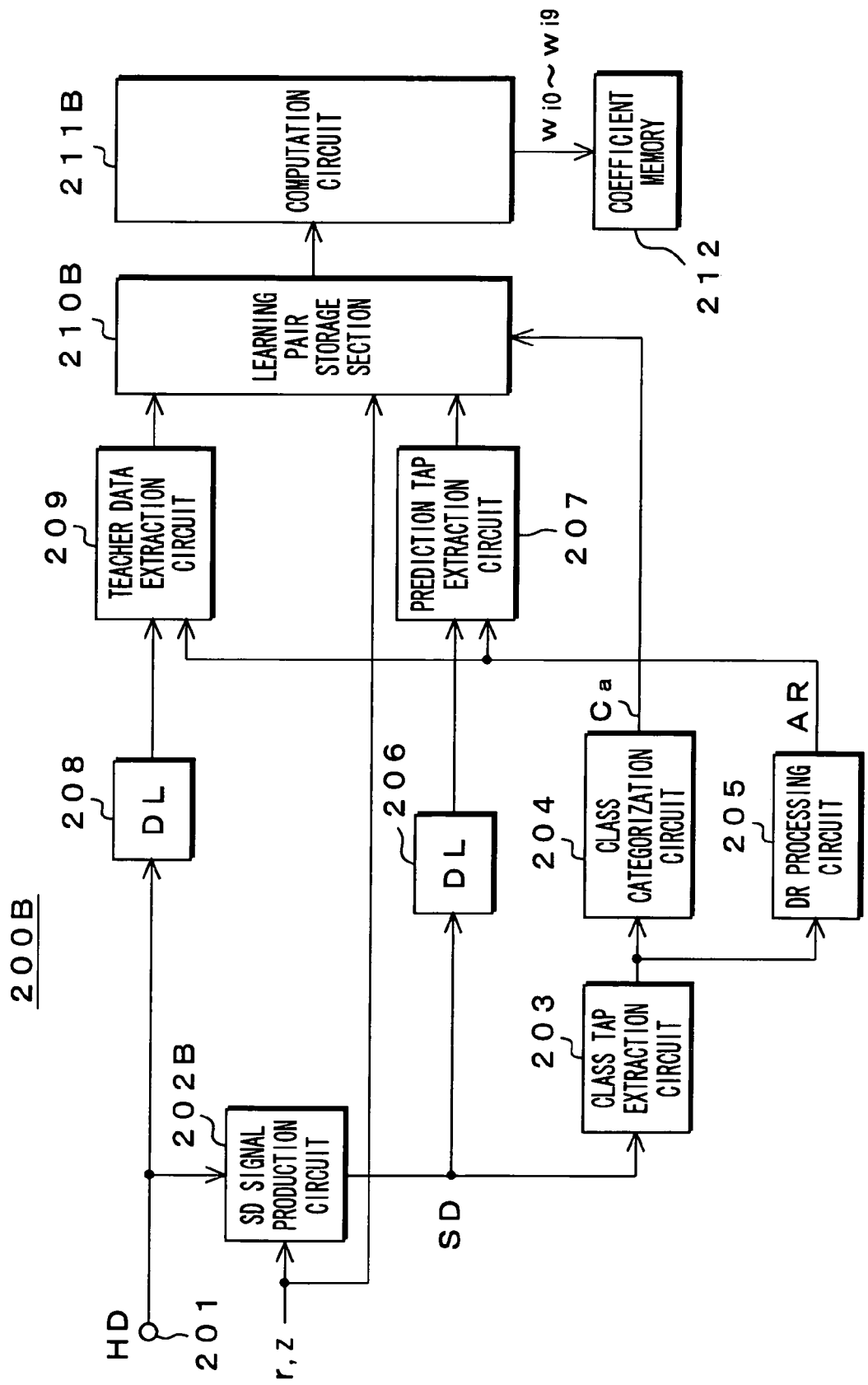

APPARATUS AND METHOD FOR PROCESSING INFORMATION SIGNAL, APPARATUS AND METHOD FOR PRODUCING COEFFICIENT, APPARATUS AND METHOD FOR PRODUCING LOOKUP TABLE, PROGRAM FOR PERFORMING EACH METHOD, AND MEDIUM RECORDING EACH PROGRAM

TECHNICAL FIELD

The present invention relates to, for example, an apparatus and a method for processing an information signal, an apparatus and method for producing a coefficient, an apparatus and method for producing a lookup table, program for performing each method, and a medium that records each program, which can well be applied to conversion, into a signal (HD signal) corresponding to a high resolution, of, for example, a standard TV signal (SD signal) corresponding to a standard resolution or a low resolution.

More specifically, it relates to the apparatus for processing the information signal etc. for, when converting a first information signal comprised of multiple items of information data into a second information signal comprised of multiple items of information data, extracting as a class tap multiple items of information data located in a periphery of a target position in the first information signal and, if a dynamic range obtained from the information data in this class tap belongs to one range, obtaining information data that constitutes the second information signal by using coefficient data that corresponds to a first class code obtained by class-categorizing this class tap based on a result of learning between a student signal (a first learning signal) and a teacher signal (a second learning signal) by use of such a portion of the dynamic range as to belong to that one range and, if the dynamic range belongs to another range different from that one range, obtaining the information data that constitutes the second information signal by performing addition mean on the information data calculated by using coefficient data that corresponds to the first class code and information data calculated by using coefficient data that corresponds to a second class code obtained by converting this first class code, thereby enabling well to be obtained the information data that constitutes the second information signal no matter whether the dynamic range is large or small.

The present invention relates also to the apparatus for processing the information signal etc. for, when converting a first information signal comprised of multiple items of information data into a second information signal comprised of multiple items of information data, extracting as a class tap multiple items of information data located in a periphery of a target position in the first information signal and, if a dynamic range obtained from the information data in this class tap belongs to one range, obtaining information data that constitutes the second information signal by using coefficient data that corresponds to a first class code obtained by class-categorizing that class tap based on a result of learning by use of such a portion of the dynamic range as to belong to that one range between a student signal (a first learning signal) and a teacher signal (a second learning signal) and, if the dynamic range belongs to another range different from that one range, obtaining the information data that constitutes the second information signal by using coefficient data based on a result of learning between the student signal and the teacher signal without performing any class-categorization thereof, thereby enabling well to be obtained the information data that constitutes the second information signal.

BACKGROUND ART

Recently, a variety of proposals have been made for a technology to improve a resolution, a sampling frequency or the like of an image signal or an audio signal. For example, in the case of up-converting a standard TV signal corresponding to a standard resolution or a low resolution into a so-called HDTV signal with a high resolution or the case of performing sub-sampling interpolation, it is known that better performance-wise results can be obtained by performing conversion processing involving class categorization rather than performing a conventional method by means of linear interpolation (see Japanese Patent Application Publication No. Hei 7-95591 and Japanese Patent Application Publication No. 2000-59740).

This conversion processing involving class categorization relates to a technology such that, for example, when converting a standard TV signal (SD signal) corresponding to a standard resolution or a low resolution into a signal (HD signal) corresponding to a high resolution, a class to which pixel data at a target position in the SD signal belongs is detected and, by using coefficient data that corresponds to this class, pixel data of the HD signal corresponding to the target position in the SD signal is produced from multiple items of pixel data of the SD signal based on an estimate equation. The coefficient data used in this conversion processing involving class categorization is determined by learning such as the least-square method for each of the classes beforehand.

It is to be noted that the coefficient data used in that conversion processing involving class categorization has been based on a result of learning without performing any categorization in accordance with whether a dynamic range is large or small, which dynamic range is a difference between a maximum value and a minimum value of multiple items of pixel data that constitute a class tap.

In this case, in view of a structure of the least-square method, such coefficient data is created as to reduce an error at a portion with a higher frequency, that is, a portion with a smaller dynamic range. Therefore, at a portion with a larger frequency, that is, a portion with a lager dynamic range, an error with respect to a true value of the pixel data of the HD signal calculated by the estimate equation is liable to be smaller.

DISCLOSURE OF THE INVENTION

It is an object of the present invention to well obtain information data that constitutes a second information signal no matter whether a dynamic range is large or small.

An apparatus for processing an information signal according to the invention is an apparatus for processing an information signal that converts a first information signal comprised of multiple items of information data into a second information signal comprised of multiple items of information data, the apparatus comprising class tap extraction means for extracting as a class tap multiple items of information data located in a periphery of a target position in the first information signal based on the first information signal, class categorization means for obtaining a first class code by categorizing the class tap extracted by the class tap extraction means as any one of a plurality of classes based on the class tap, dynamic range processing means for detecting a dynamic range which is a difference between a maximum value and a minimum value of the multiple items of information data contained in the class tap extracted by the class tap extraction means based on the class tap, to obtain area information that indicates which one of a plurality of sub-divided areas obtained by dividing a possible area of the dynamic range into plural ones the dynamic range belongs to, class code conversion means for converting the first class code obtained by the class categorization means into one or a plurality of second class codes each corresponding to the first class code, prediction tap extraction means for extracting as a prediction tap multiple items of information data located in a periphery of the target position in the first information signal based on the first information signal, first coefficient data generation means for generating first coefficient data, which is used in an estimate equation corresponding to the first class code obtained by the class categorization means, second coefficient data generation means for generating second coefficient data, which is used in the estimate equation, corresponding to one or the plurality of second class codes, respectively, obtained through conversion by the class code conversion means, first computation means for calculating information data based on the estimate equation, by using the first coefficient data generated by the first coefficient data generation means and the prediction tap extracted by the prediction tap extraction means, second computation means for calculating information data based on the estimate equation, by using the second coefficient data generated by the second coefficient data generation means and the prediction tap extracted by the prediction tap extraction means, and addition means for outputting the information data calculated by the first computation means as information data that constitutes the second information signal corresponding to a target position in the first information signal if the dynamic range belongs to one sub-divided area according to the area information obtained by the dynamic range processing means and, if the dynamic range belongs to another sub-divided area different from the one sub-divided area, outputting data obtained by performing addition mean on the information data calculated by the first computation means and that calculated by the second computation means as the information data that constitutes the second information signal corresponding to the target position in the first information signal, wherein the first coefficient data generated by the first coefficient data generation means and the second coefficient data generated by the second coefficient data generation means are based on a result of learning between a first learning signal that corresponds to the first information signal and a second learning signal that corresponds to the second information signal by use of such a portion of the dynamic range as to belong to the one sub-divided area, and wherein the class code conversion means converts the first class code into the second class code in such a manner that the addition mean value of the information data calculated by the first computation means corresponding to the first class code and the information data calculated by the second computation means corresponding to the second class code may most approach a true value of the information data that constitutes the second information signal.

A method for processing an information signal according to the invention is a method for processing an information signal that converts a first information signal comprised of multiple items of information data into a second information signal comprised of multiple items of information data, the method comprising a class tap extraction step of extracting as a class tap multiple items of information data located in a periphery of a target position in the first information signal based on the first information signal, a class categorization step of obtaining a first class code by categorizing the class tap extracted by the class tap extraction step as any one of a plurality of classes based on the class tap, a dynamic range processing step of detecting a dynamic range which is a difference between a maximum value and a minimum value of the multiple items of information data contained in the class tap extracted by the class tap extraction step based on the class tap, to obtain area information that indicates which one of a plurality of sub-divided areas obtained by dividing a possible area of the dynamic range into plural ones the dynamic range belongs to, a class code conversion step of converting a first class code obtained by the class categorization step into one or a plurality of second class codes each corresponding to the first class code, a prediction tap extraction step of extracting as a prediction tap multiple items of information data located in a periphery of the target position in the first information signal based on the first information signal, a first coefficient data generation step of generating first coefficient data, which is used in an estimate equation corresponding to the first class code obtained by the class categorization step, a second coefficient data generation step of generating second coefficient data, which is used in the estimate equation, corresponding to one or the plurality of second class codes, respectively, obtained through conversion by the class code conversion step, a first computation step of calculating information data based on the estimate equation, by using the first coefficient data generated by the first coefficient data generation step and the prediction tap extracted by the prediction tap extraction step, a second computation step of calculating information data based on the estimate equation, by using the second coefficient data generated by the second coefficient data generation step and the prediction tap extracted by the prediction tap extraction step, and an addition step of outputting the information data calculated by the first computation step as information data that constitutes the second information signal corresponding to a target position in the first information signal if the dynamic range belongs to one sub-divided area according to the area information obtained by the dynamic range processing step and, if the dynamic range belongs to another sub-divided area different from the one sub-divided area, outputting data obtained by performing addition mean on the information data calculated by the first computation step and that calculated by the second computation step as the information data that constitutes the second information signal corresponding to the target position in the first information signal.

The first coefficient data generated by the first coefficient data generation step and the second coefficient data generated by the second coefficient data generation step are then based on a result of learning between a first learning signal that corresponds to the first information signal and a second learning signal that corresponds to the second information signal by use of such a portion of the dynamic range as to belong to the one sub-divided area, and in the class code conversion step, the first class code is converted into the second class code in such a manner that the addition mean value of the information data calculated by the first computation step corresponding to the first class code and the information data calculated by the second computation step corresponding to the second class code may most approach a true value of the information data that constitutes the second information signal.

Further, a program related to the present invention causes a computer to perform the above-described method for processing the information signal. A computer-readable medium related to the present invention records this program.

In the present invention, a first information signal comprised of multiple items of information data is converted into a second information signal comprised of multiple items of information data. It is to be noted that an information signal refers to, for example, an image signal comprised of multiple items of pixel data (sample data), an audio signal comprised of multiple items of sample data, etc.

In this case, based on the first information signal, multiple items of information data located in a periphery of the target position in this first information signal are extracted as a class tap. Then, this class tap is categorized as any one of a plurality of classes, to obtain a first class code.

Further, a dynamic range is detected which is a difference between a maximum value and a minimum value of the multiple items of information data contained in this class tap, to obtain area information that indicates which one of a plurality of sub-divided ranges into which a possible range of the dynamic range is divided into plural ones this dynamic range belongs to. For example, the area information indicating whether a dynamic range is less than or not less than a threshold value is obtained.

The first class code obtained by categorizing the above-described class tap is converted into one or a plurality of second class codes corresponding to this first class code. For example, the conversion is performed by referencing a lookup table in which a correspondence relationship between the first class code and the second class code is stored.

In this case, the first class code is converted into the second class code so that an addition mean value of information data calculated by using first coefficient data that corresponds to the first class code and information data calculated by using second coefficient data that corresponds to the second class code may most approach a true value of the information data that constitutes the second information signal.

Further, the first coefficient data is generated which is used in an estimate equation that corresponds to a first class code obtained by categorizing the above-described class tap, while the second coefficient data is generated which is used in the estimate equation that corresponds to one or a plurality of second class codes, respectively, obtained by converting the first class code as described above.

It is to be noted that the first coefficient data and the second coefficient data are based on a result of learning between a first learning signal that corresponds to the first information signal and a second learning signal that corresponds to the second information signal by use of such a portion of a dynamic range as to belong to one sub-divided range.

For example, coefficient data of each class obtained beforehand, which is used in the estimate equation, is stored in storage means, from which coefficient data that corresponds to a class indicated by a class code is read.

Further, for example, coefficient seed data of each class obtained beforehand, which is coefficient data in a production equation, which includes a predetermined parameter, for producing coefficient data used in the estimate equation is stored in the storage means, so that coefficient data, which is used in the estimate equation, can be produced on the basis of the production equation by using the coefficient seed data that corresponds to a class indicated by a class code stored in this storage means.

Further, based on the first information signal, multiple items of information data located in a periphery of a target position in this first information signal are extracted as a prediction tap. Then, the first coefficient data produced as described above and this prediction tap are used to calculate information data based on the estimate equation. Furthermore, the second coefficient data produced as described above and this prediction tap are used to calculate information data based on the estimate equation.

If a dynamic range belongs to one sub-divided area, information data calculated by using the first coefficient data as described above is output as information data that constitutes the second information signal corresponding to a target position in the first information signal. If the dynamic range belongs to another sub-divided range different from the one sub-divided range, data obtained by performing addition mean on items of the information data calculated by respectively using the first coefficient data and the second coefficient data as described above is output as information data that constitutes the second information signal corresponding to the target position in the first information signal.

For example, if the dynamic range is not less than a threshold value, the information data calculated by using the first coefficient data is output and, if the dynamic range is less than a threshold value, data obtained by performing addition mean on items of the information data calculated by respectively using the first and second coefficient data is output.

In such a manner, in the present invention, if the dynamic range belongs to one sub-divided area, information data calculated by using the first coefficient data obtained so as to correspond to the first class code obtained on the basis of a class tap is output as information data that constitutes the second information signal. In this case, the first coefficient data is based on a result of learning between a first learning signal that corresponds to the first information signal and a second learning signal that corresponds to the second information signal by use of such a portion of the dynamic range as to belong to the one sub-divided range, to enable the information data that constitutes the second information signal to be accurately obtained.

Further, in the present invention, if the dynamic range belongs to another sub-divided range different from the one sub-divided range, data obtained by performing addition mean on items of information data calculated by respectively using the first coefficient data obtained as to correspond to the first class code and the second coefficient data obtained so as to correspond to the second class code obtained by converting this first class code is output as information data that constitutes the second information signal. In this case, the first class code is converted into the second class code so that an addition mean value of the information data calculated by using the first coefficient data obtained so as to correspond to the first class code and the information data calculated by using the second coefficient data obtained so as to correspond to the second class code may most approach a true value of the information data that constitutes the above-described second information signal, thereby enabling accurately to be obtained the information data that constitutes the second information signal.

It is thus, in the present invention, possible to well obtain the information data that constitutes the second information signal no matter whether the dynamic range is large or small.

An apparatus for processing an information signal according to the invention is an apparatus for processing an information signal that converts a first information signal comprised of multiple items of information data into a second information signal comprised of multiple items of information data, the apparatus comprising class tap extraction means for extracting as a class tap multiple items of information data located in a periphery of a target position in the first information signal based on the first information signal, class categorization means for obtaining a class code by categorizing the class tap extracted by the class tap extraction means as any one of a plurality of classes based on the class tap, dynamic range processing means for detecting a dynamic range, which is a difference between a maximum value and a minimum value of multiple items of information data contained in the class tap extracted by the class tap extraction means based on the class tap, to obtain area information that indicates which one of a plurality of sub-divided areas obtained by dividing a possible area of the dynamic range into plural ones the dynamic range belongs to, prediction tap extraction means for extracting as a prediction tap multiple items of information data located in a periphery of the target position in the first information signal based on the first information signal, coefficient data generation means for generating first coefficient data, which is used in an estimate equation corresponding to the class code, if the dynamic range belongs to one sub-divided area, according to the area information obtained by the dynamic range processing means and the class code obtained by the class categorization means and for generating second coefficient data, which is used in the estimate equation, if the dynamic range belongs to another sub-divided area different from the one sub-divided area, and computation means for calculate information data that constitutes the second information signal corresponding to the target position in the first information signal based on the estimate equation using the first coefficient data or the second coefficient data generated by the coefficient data generation means and the prediction tap extracted by the prediction tap extraction means, wherein the first coefficient data generated by the first coefficient data generation means is based on a result of learning between a first learning signal that corresponds to the first information signal and a second learning signal that corresponds to the second information signal by use of such a portion of the dynamic range as to belong to the one sub-divided area, and wherein the second coefficient data generated by the second coefficient data generation means is based on a result of learning, without the class categorization, between the first learning signal that corresponds to the first information signal and the second learning signal that corresponds to the second information signal.

A method for processing an information signal according to the invention is a method for processing an information signal that converts a first information signal comprised of multiple items of information data into a second information signal comprised of multiple items of information data, the method comprising a class tap extraction step of extracting as a class tap multiple items of information data located in a periphery of a target position in the first information signal based on the first information signal, a class categorization step of obtaining a class code by categorizing the class tap extracted by the class tap extraction step as any one of a plurality of classes based on the class tap, a dynamic range processing step of detecting a dynamic range, which is a difference between a maximum value and a minimum value of multiple items of information data contained in the class tap extracted by the class tap extraction step based on the class tap, to obtain area information that indicates which one of a plurality of sub-divided areas obtained by dividing a possible area of the dynamic range into plural ones the dynamic range belongs to, a prediction tap extraction step of extracting as a prediction tap multiple items of information data located in a periphery of the target position in the first information signal based on the first information signal, a coefficient data generation step of generating first coefficient data, which is used in an estimate equation corresponding to the class code, if the dynamic range belongs to one sub-divided area, according to the area information obtained by the dynamic range processing step and the class code obtained by the class categorization step and for generating second coefficient data, which is used in the estimate equation, if the dynamic range belongs to another sub-divided area different from the one sub-divided area, and a computation step of calculating information data that constitutes the second information signal corresponding to the target position in the first information signal based on the estimate equation using the first coefficient data or the second coefficient data generated by the coefficient data generation step and the prediction tap extracted by the prediction tap extraction step.

The first coefficient data generated by the first coefficient data generation step is based on a result of learning between a first learning signal that corresponds to the first information signal and a second learning signal that corresponds to the second information signal by use of such a portion of the dynamic range as to belong to the one sub-divided area, and the second coefficient data generated by the second coefficient data generation step is based on a result of learning, without the class categorization, between the first learning signal that corresponds to the first information signal and the second learning signal that corresponds to the second information signal.

Further, a program related to the present invention causes a computer to perform the above-described method for processing the information signal. A computer-readable medium related to the present invention records this program.

In the present invention, a first information signal comprised of multiple items of information data is converted into a second information signal comprised of multiple items of information data. It is to be noted that an information signal refers to, for example, an image signal comprised of multiple items of pixel data (sample data), an audio signal comprised of multiple items of sample data, etc.

In this case, based on the first information signal, multiple items of information data located in a periphery of the target position in this first information signal are extracted as a class tap. Then, this class tap is categorized as any one of a plurality of classes, to obtain a class code.

Further, a dynamic range is detected which is a difference between a maximum value and a minimum value of the multiple items of information data contained in this class tap, to obtain area information that indicates which one of a plurality of sub-divided ranges into which a possible range of the dynamic range is divided into plural ones this dynamic range belongs to. For example, the area information indicating whether a dynamic range is less than or not less than a threshold value is obtained.

If the dynamic range belongs to one sub-divided range, first coefficient data is generated which is used in an estimate equation that corresponds to a class code obtained by categorizing the above-described class tap. If the dynamic range belongs to another sub-divided range different from the one sub-divided range, on the other hand, second coefficient data is generated which is used in the estimate equation.

It is to be noted that the coefficient data is based on a result of learning between a first learning signal that corresponds to the first information signal and a second learning signal that corresponds to the second information signal by use of such a portion of the dynamic range as to belong to the one sub-divided range. The second coefficient data, on the other hand, is based on a result of learning, without class categorization, between a first learning signal that corresponds to the first information signal and a second learning signal that corresponds to the second information signal.

For example, the first coefficient data of each class used in an estimate equation and the second coefficient data used in the estimate equation, which are obtained beforehand, are stored in the storage means, from which the first coefficient data that corresponds to a class indicated by a class code is read if a dynamic range belongs to one sub-divided range and the second coefficient data is read if the dynamic range belongs to another sub-divided range different from that one sub-divided range.

Further, for example, first coefficient seed data of each class, which is coefficient data in a production equation, which includes a predetermined parameter, for producing first coefficient data to be used in the estimate equation, and second coefficient seed data, which is coefficient data in the production equation for producing second coefficient data to be used in the estimate equation, the first coefficient seed data and the second coefficient seed data obtained beforehand, are stored in storage means, so that if a dynamic range belongs to one sub-divided range, the first coefficient data used in the estimate equation is produced based on the production equation using first coefficient seed data that corresponds to a class indicated by the class code stored in that storage means, and if the dynamic range belongs to another sub-divided range different from that one sub-divided range, the second coefficient data used in the estimate equation is produced based on the production equation using the second coefficient seed data stored in the storage means.

Further, based on the first information signal, multiple items of information data located in a periphery of a target position in this first information signal are extracted as a prediction tap. Then, the first coefficient data or the second coefficient data, which is produced as described above, and this prediction tap are used to calculate information data, which constitutes the second information signal, corresponding to a target position of the first information signal based on the estimate equation.

In such a manner, in the present invention, if the dynamic range belongs to one sub-divided area, the information data calculated by using the first coefficient data obtained so as to correspond to the class code obtained on the basis of the class tap is output as information data that constitutes the second information signal. In this case, the first coefficient data is based on a result of learning between the first learning signal that corresponds to the first information signal and the second learning signal that corresponds to the second information signal by use of such a portion of the dynamic range as to belong to the one sub-divided range, to enable the information data that constitutes the second information signal to be accurately obtained.

Further, in the present invention, if a dynamic range belongs to another sub-divided range different from the one sub-divided area, information data calculated by using the second coefficient data is output as information data that constitutes the second information signal. In this case, the second coefficient data is based on a result of learning, without class categorization, between the first learning signal that corresponds to the first information signal and the second learning signal that corresponds to the second information signal. Therefore, this second coefficient data is an average of items of the coefficient data of the classes, so that an error of the information data that constitutes the second information signal, which is calculated by using this second coefficient data, with respect to a true value of this information data is distributed in the vicinity of error 0.

It is thus, in the present invention, possible to well obtain the information data that constitutes the second information signal no matter whether the dynamic range is large or small.

An apparatus for producing coefficient according to the invention is an apparatus for producing coefficient that produces coefficient data, which is used in an estimate equation to be used when converting a first information signal comprised of multiple items of information data into a second information signal comprised of multiple items of information data or coefficient seed data, which is coefficient data in a production equation for producing the former coefficient data, the apparatus comprising class tap extraction means for extracting as a class tap multiple items of information data located in a periphery of a target position in a first learning signal that corresponds to the first information signal based on the first learning signal, class categorization means for obtaining a class code by categorizing the class tap extracted by the class tap extraction means as any one of a plurality of classes based on the class tap, dynamic range processing means for detecting a dynamic range, which is a difference between a maximum value and a minimum value of multiple items of information data contained in the class tap extracted by the class tap extraction means based on the class tap, to obtain area information that indicates which one of a plurality of sub-divided areas obtained by dividing a possible area of the dynamic range into plural ones the dynamic range belongs to, prediction tap extraction means for extracting as a prediction tap multiple items of information data located in a periphery of the target position in the first learning signal based on the first learning signal if the dynamic range belongs to one sub-divided area according to the area information obtained by the dynamic range processing means, teacher data extraction means for extracting, as teacher data, information data that corresponds to the target position in the first learning signal based on a second learning signal that corresponds to the second information signal if the dynamic range belongs to the one sub-divided area according to the area information obtained by the dynamic range processing means, and computation means for obtaining the coefficient data of each class or the coefficient seed data of each class by using the class code obtained by the class categorization means, the prediction tap extracted by the prediction tap extraction means, and the teacher data extracted by the teacher data extraction means.

A method for producing coefficient according to the invention is a method for producing coefficient that produces coefficient data, which is used in an estimate equation to be used when converting a first information signal comprised of multiple items of information data into a second information signal comprised of multiple items of information data or coefficient seed data, which is coefficient data in a production equation for producing the former coefficient data, the method comprising a class tap extraction step of extracting as a class tap multiple items of information data located in a periphery of a target position in a first learning signal that corresponds to the first information signal based on the first learning signal, a class code categorization step of obtaining a class code by categorizing the class tap extracted by the class tap extraction step as any one of a plurality of classes based on the class tap, a dynamic range processing step of detecting a dynamic range, which is a difference between a maximum value and a minimum value of multiple items of information data contained in the class tap extracted by the class tap extraction step based on the class tap, to obtain area information that indicates which one of a plurality of sub-divided areas obtained by dividing a possible area of the dynamic range into plural ones the dynamic range belongs to, a prediction tap extraction step of extracting as a prediction tap multiple items of information data located in a periphery of the target position in the first learning signal based on the first learning signal if the dynamic range belongs to one sub-divided area according to the area information obtained by the dynamic range processing step, a teacher data extraction step of extracting, as teacher data, information data that corresponds to the target position in the first learning signal based on a second learning signal that corresponds to the second information signal if the dynamic range belongs to the one sub-divided area according to the area information obtained by the dynamic range processing step, and a computation step of obtaining the coefficient data of each class or the coefficient seed data of each class by using the class code obtained by the class categorization step, the prediction tap extracted by the prediction tap extraction step, and the teacher data extracted by the teacher data extraction step.

Further, a program related to the present invention causes a computer to perform the above-described method for processing the information signal. A computer-readable medium related to the present invention records this program.

In the present invention, the coefficient data is produced which is used in the estimate equation used when converting a first information signal comprised of multiple items of information data into a second information signal comprised of multiple items of information data or the coefficient seed data is produced which is coefficient data in a production equation for producing this coefficient data. It is to be noted that the information signal is, for example, an image signal or an audio signal.

Multiple items of information data located in a periphery of the target position in this first learning signal are extracted as a class tap on the basis of a first learning signal that corresponds to the first information signal. Then, this class tap is categorized as any one of a plurality of classes, to obtain a class code.

Further, the dynamic range is detected which is a difference between a maximum value and a minimum value of the multiple items of information data contained in this class tap, to obtain the area information that indicates which one of a plurality of sub-divided ranges into which a possible range of the dynamic range is divided into plural ones this dynamic range belongs to. For example, the area information indicating whether a dynamic range is less than or not less than a threshold value is obtained.

If a dynamic range belongs to one sub-divided range, multiple items of information data located in a periphery of the target position in the first learning signal are extracted as a prediction tap based on the first learning signal, while information data that corresponds to the target position in the first learning signal is extracted as teacher data based on a second learning signal that corresponds to the second information signal.

Then, the class code thus obtained and the prediction tap and the teacher data thus extracted are used to obtain the coefficient data of each class or the coefficient seed data of each class. For example, for each class, a normalization equation is produced, so that by solving the normalization equation, the coefficient data of each class or the coefficient seed data of each class can be calculated.

In such a manner, in the present invention, by performing learning between a first learning signal that corresponds to the first information signal and a second learning signal that corresponds to the second information signal using such a portion of the dynamic range as to belong to one sub-divided range, coefficient data of each class or coefficient seed data of each class is obtained, thereby enabling well to be obtained the coefficient data that is used in the above-described apparatus for processing the information signal etc.

An apparatus for producing a lookup table according to the invention is an apparatus for producing a lookup table that produces a correspondence relationship between a first class code and a second class code, which are used when converting a first information signal comprised of multiple items of information data into a second information signal comprised of multiple items of information data, the apparatus comprising class tap extraction means for extracting as a class tap multiple items of information data located in a periphery of a target position in a first learning signal that corresponds to the first information signal based on the first learning signal, class categorization means for obtaining a class code by categorizing the class tap extracted by the class tap extraction means as any class of a plurality of class taps based on the class tap, dynamic range processing means for detecting a dynamic range which is a difference between a maximum value and a minimum value of multiple items of information data contained in the class tap extracted by the class tap extraction means based on the class tap, to obtain area information that indicates which one of a plurality of sub-divided areas obtained by dividing a possible area of the dynamic range into plural ones the dynamic range belongs to, prediction tap extraction means for extracting as a prediction tap multiple items of information data located in a periphery of the target position in the first learning signal based on the first learning signal, first coefficient data generation means for generating coefficient data, which is used in an estimate equation at a class that corresponds to a class code obtained by the class categorization means, predictive computation means for calculating information data that corresponds to a target position in the first learning signal based on the estimate equation using the coefficient data generated by the first coefficient data generation means and the prediction tap extracted by the prediction tap extraction means, second coefficient data generation means for generating coefficient data, which is used in an estimate equation at the plurality of classes, all-the-class predictive computation means for calculating information data that corresponds to a target position in the first learning signal for each of the classes based on the estimate equation using coefficient data of each class generated by the second coefficient data generation means and a prediction tap extracted by the prediction tap extraction means, teacher data extraction means for extracting, as teacher data, information data that corresponds to a target position in the first learning signal based on a second learning signal that corresponds to the second information signal, error calculation means for calculating an error of the information data obtained by the predictive computation means with respect to the teacher data extracted by the teacher data extraction means, all-the-class error calculation means for calculating an error of information data of each of the classes obtained by the all-the-class predictive computation means with respect to the teacher data extracted by the teacher data extraction means, error addition means for adding an error obtained by the error calculation means to an error of each of the classes obtained by the all-the-class calculation means to obtain an error sum of the classes, error sum accumulation means for adding a value that corresponds to a magnitude of the error sum of each of the classes obtained by the error addition means to an accumulated value of each output class at an input class that corresponds to the class code obtained by the class categorization means if the dynamic range belongs to another sub-divided area different from that one sub-divided area according to the area information obtained by the dynamic range processing means, and table production means for allocating an output class in which an accumulated value of each output class to each of the input classes, the accumulated value being obtained by the error sum accumulation means, is minimized based on the accumulated value at each of the input classes, to produce a correspondence relationship between the first class code that corresponds to the input class and the second class code that corresponds to the output class. The items of the coefficient data generated by the first coefficient data generation means and generated by the second coefficient data generation means are based on a result of learning between a first learning signal that corresponds to the first information signal and a second learning signal that corresponds to the second information signal by use of only such a portion of the dynamic range as to belong to the one sub-divided area.

A method for producing a lookup table according to the invention is a method for producing a lookup table that produces a correspondence relationship between a first class code and a second class code, which are used when converting a first information signal comprised of multiple items of information data into a second information signal comprised of multiple items of information data, the method comprising a class tap extraction step of extracting as a class tap multiple items of information data located in a periphery of a target position in a first learning signal that corresponds to the first information signal based on the first learning signal, a class categorization step of obtaining a class code by categorizing the class tap extracted by the class tap extraction step as any class of a plurality of class taps based on the class tap, a dynamic range processing step of detecting a dynamic range which is a difference between a maximum value and a minimum value of multiple items of information data contained in the class tap extracted by the class tap extraction step based on the class tap, to obtain area information that indicates which one of a plurality of sub-divided areas obtained by dividing a possible area of the dynamic range into plural ones the dynamic range belongs to, a prediction tap extraction step of extracting as a prediction tap multiple items of information data located in a periphery of the target position in the first learning signal based on the first learning signal, a first coefficient data generation step of generating coefficient data, which is used in an estimate equation at a class that corresponds to a class code obtained by the class categorization step, a predictive computation step of calculating information data that corresponds to a target position in the first learning signal based on the estimate equation using coefficient data generated by the first coefficient data generation step and the prediction tap extracted by the prediction tap extraction step, a second coefficient data generation step of generating coefficient data, which is used in an estimate equation at the plurality of classes, an all-the-class predictive computation step of calculating information data that corresponds to a target position in the first learning signal for each of the classes based on the estimate equation using coefficient data of each class generated by the second coefficient data generation step and a prediction tap extracted by the prediction tap extraction step, a teacher data extraction step of extracting, as teacher data, information data that corresponds to a target position in the first learning signal based on a second learning signal that corresponds to the second information signal, an error calculation step of calculating an error of the information data obtained by the predictive computation step with respect to the teacher data extracted by the teacher data extraction step, an all-the-class error calculation step of calculating an error of information data of each of the classes obtained by the all-the-class predictive computation step with respect to teacher data extracted by the teacher data extraction step, an error addition step of adding an error obtained by the error calculation step to an error of each of the classes obtained by the all-the-class calculation step to obtain an error sum of the classes, an error sum accumulation step of adding a value that corresponds to a magnitude of an error sum of each of the classes obtained by the error addition step to an accumulated value of each output class at an input class that corresponds to the class code obtained by the class categorization step if the dynamic range belongs to another sub-divided area different from that one sub-divided area according to the area information obtained by the dynamic range processing step, and a table production step of allocating an output class in which an accumulated value of each output class to each of the input classes, the accumulated value being obtained by the error sum accumulation step, is minimized based on the accumulated value at each of the input classes, to produce a correspondence relationship between the first class code that corresponds to the input class and the second class code that corresponds to the output class. The items of the coefficient data generated by the first coefficient data generation step and generated by the second coefficient data generation step are based on a result of learning between a first learning signal that corresponds to the first information signal and a second learning signal that corresponds to the second information signal by use of only such a portion of the dynamic range as to belong to the one sub-divided area.

Further, a program related to the present invention causes a computer to perform the above-described method for processing the information signal. A computer-readable medium related to the present invention records this program.

In the present invention, a correspondence relationship is produced between a first class code and a second class code, which is used when converting a first information signal comprised of multiple items of information data into a second information signal comprised of multiple items of information data. It is to be noted that the information signal is, for example, an image signal or an audio signal.

Based on the first learning signal that corresponds to the first information signal, multiple items of information data located in a periphery of the target position in this first learning signal are extracted as a class tap. Then, this class tap is categorized as any one of a plurality of classes, to obtain a class code.

Further, the dynamic range is detected which is a difference between a maximum value and a minimum value of the multiple items of information data contained in this class tap, to obtain area information that indicates which one of a plurality of sub-divided ranges into which a possible range of the dynamic range is divided into plural ones this dynamic range belongs to. For example, the area information indicating whether a dynamic range is less than or not less than a threshold value is obtained.

Further, based on a student signal, multiple items of information data located in a periphery of the target position in this first learning signal is extracted as a prediction tap. Further, coefficient data is produced which is used in an estimate equation at a class that corresponds to the class code obtained by categorizing class taps as described above. Then, these coefficient data and prediction tap are used to calculate information data that corresponds to a target position in the first learning signal based on the estimate equation.

Further, coefficient data is produced which is used in an estimate equation at a plurality of classes. Then, the coefficient data of each class and the prediction tap are used to calculate information data that corresponds to a target position in the first learning signal for each class based on the estimate equation.

It is to be noted that the coefficient data generated as described above is based on a result of learning between a first learning signal that corresponds to the first information signal and a second learning signal that corresponds to the second information signal by use only of such a portion of a dynamic range as to belong to one sub-divided range.

Further, information data that corresponds to a target position in the first learning signal is extracted as teacher data based on the second learning signal that corresponds to the second information signal. Then, with respect to this teacher data, an error is computed of information data that corresponds to a class code calculated as described above. Furthermore, with respect to this teacher data, an error is computed of information data of each class calculated as described above.

Further, the error for the class code and the error for each class are added to obtain an error sum for each class. Then, if a dynamic range belongs to another sub-divided range different from the one sub-divided range, a value that corresponds to a value of the error sum for each class is added to an accumulated value for each of the output classes at an input class that corresponds to a class code.

Then, based on the accumulated value for each of the output classes at each input class, such an output class as to minimize the accumulated value is allocated to each of the input classes, to produce a correspondence relationship between a first class code that corresponds to the input class and a second class code that corresponds to the output class.

In such a manner, in the present invention, if a dynamic range belongs to another range different from that one range, it is possible to well produce such a lookup table that a first class code can be converted into a second class code in such a manner that an addition mean value of information data calculated by using coefficient data that corresponds to the first class code and information data calculated by using coefficient data that corresponds to the second class code may most approach to a true value of information data that constitutes the second information signal.

BRIEF DESCRIPTION OF THE DRAWINGS

FIG. 8 is a diagram illustrating accumulation processing;

FIG. 9 is a diagram illustrating output class allocation processing;

FIG. 16 is a block diagram showing a configuration of an apparatus for processing an image signal according to a further embodiment;

FIG. 17 is a diagram illustrating a method for producing coefficient seed data;

FIG. 18 is a block diagram showing a configuration of an apparatus for producing coefficient seed data.

BEST MODE FOR CARRYING OUT THE INVENTION

Figure 1:
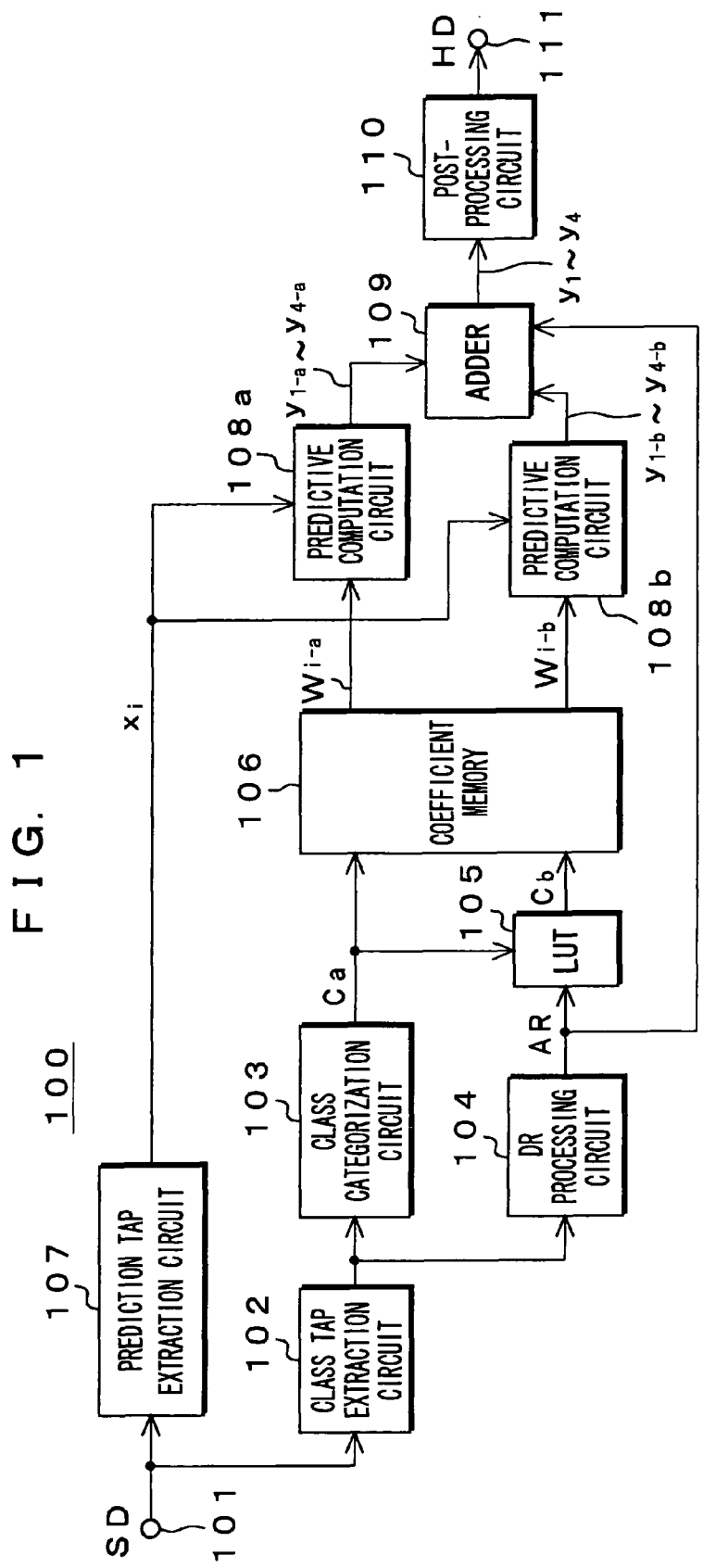
FIG. 1 is a block diagram showing a configuration of an apparatus for processing an image signal according to an embodiment.

The following will describe embodiments of the present invention with reference to drawings. FIG. 1 shows a configuration of an apparatus 100 for processing an image signal according to an embodiment. This apparatus 100 for processing the image signal converts an image signal having a low resolution or standard resolution (hereinafter referred to as "standard definition (SD) signal") into an image signal having high resolution (hereinafter referred to as "high definition (HD) signal"). It is to be noted that the SD signal constitutes a first information signal and the HD signal constitutes a second information signal.

Figure 2:
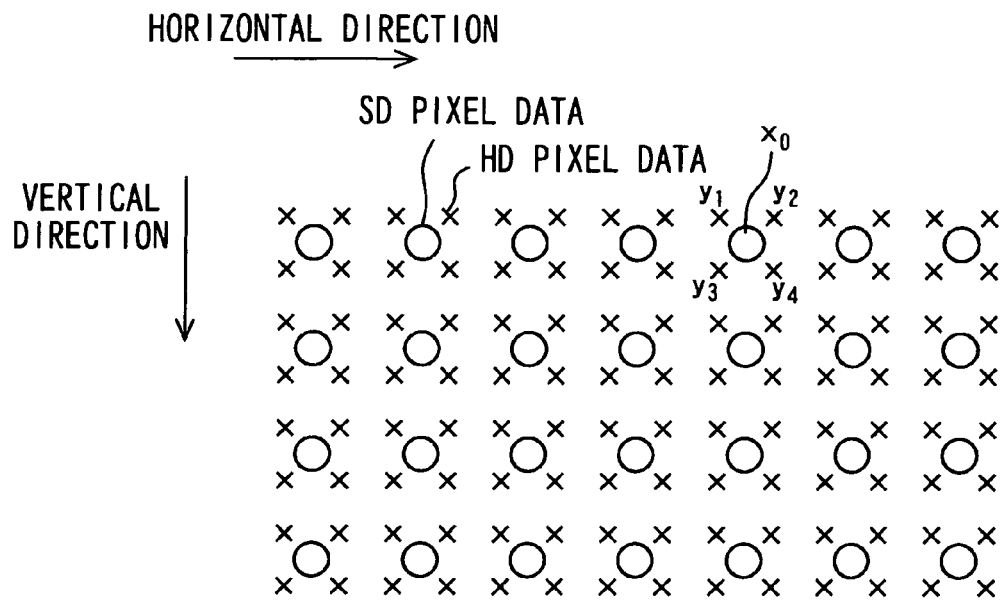
FIG. 2 is a block diagram showing a positional relationship of pixels between an SD signal and an HD signal.

FIG. 2 shows a positional relationship of pixels between an SD signal and an HD signal. ○ indicates a pixel position of the SD signal and "X", a pixel position of the HD signal. In this case, to one pixel of the SD signal, four pixels of the HD signal correspond. That is, in the present embodiment, an SD signal is converted into an HD signal having twice the numbers of vertical and horizontal pixels, respectively. In the present embodiment, each of the SD and HD signals is comprised of multiple items of pixel data of 8-bit.

Figure 3A:
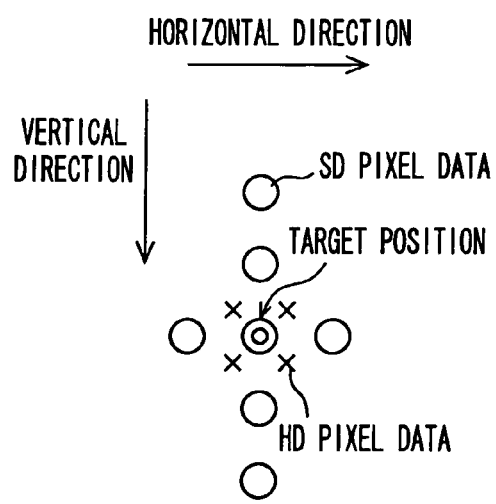
FIG. 3A is a block diagram showing one example of a class tap.

Referring back to FIG. 1, the apparatus 100 for processing the image signal comprises an input terminal 101 to which an SD signal is input and a class tap extraction circuit 102 for extracting as a class tap a plurality of pixel data pieces located in a periphery of a target position in an SD signal input to this input terminal 101, based on this SD signal. In the present embodiment, for example, as shown in FIG. 3A, seven SD pixel data pieces located in a periphery of a target position in the SD signal are extracted as a class tap.

The apparatus 100 for processing the image signal further comprises a class categorization circuit 103 for categorizing a class tap extracted by the class tap extraction circuit 102 as any one of a plurality of classes based on this class tap to obtain a class code Ca indicative of a class of this class tap. This class categorization is performed by utilizing any compression processing such as adaptive dynamic range coding (ADRC), differential pulse code modulation (DPCM) (in prediction coding), or vector quantization (VQ).

The following will describe a case of performing K-bit ADRC. In the K-bit ADRC, a dynamic range DR=MAX−MIN is detected, which is a difference between a maximum value MAX and a minimum value MIN of items of pixel data included in a class tap, and based on this dynamic range DR, each of the items of pixel data included in the class tap is re-quantized into K bits.

That is, each of the items of pixel data included in a class tap is subtracted by a minimum value MIN and a resultant remainder is divided (quantized) by $DR/2^K$. In such a manner, each of the items of pixel data that constitute the class tap is re-quantized into K bits, which are arranged in predetermined order into a bit string that is then output as a class code Ca.

Therefore, in 1-bit ADRC, each of the items of pixel data included in this class tap is subtracted by a minimum value MIN and a resultant remainder is divided by DR/2. Accordingly, each of the items of pixel data included in the class tap is re-quantized into one bit, which are arranged in predetermined order into a bit string that is then output as a class code Ca.

The apparatus 100 for processing the image signal further comprises a dynamic range processing circuit (DR processing circuit) 104. This DR processing circuit 104 detects a dynamic range DR=MAX−MIN, which is a difference between a maximum value MAX and a minimum value MIN of items of pixel data included in a class tap extracted by the class tap extraction circuit 102, to acquire an area information AR that indicates which one of a plurality of sub-divided areas obtained by dividing a possible area of this dynamic range DR into plural ones it belongs to.

In the present embodiment, the possible coverage area of the dynamic range DR is divided by two by using a predetermined threshold value Th. If DR≧Th, that is, if the dynamic range DR is not less than the threshold value Th, the DR processing circuit 104 outputs "0" as area information AR, while if DR<Th, that is, if the dynamic range DR is less than the threshold value Th, it outputs "1" as the area information AR.

Figures 3B, 4:
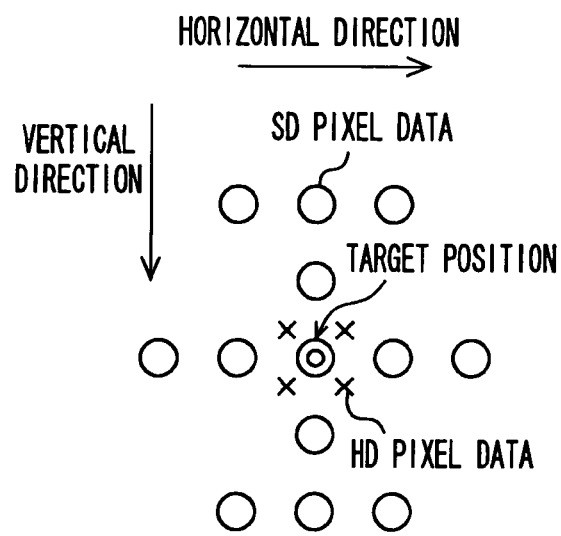
FIG. 3B is a block diagram showing one example of a prediction tap.
FIG. 4 is a block diagram showing a configuration of a lookup table.

The apparatus 100 for processing the image signal further comprises a lookup table (LUT) 105 as class code conversion means for converting a class code Ca obtained by the class categorization circuit 103 into a class code Cb that corresponds to this class code Ca. This lookup table 105 is controlled in its operation based on the area information AR obtained by the DR processing circuit 104. That is, this lookup table 105 becomes active only when the area information AR is "1", to output the class code Cb that corresponds to the class code Ca. FIG. 4 shows a configuration of the lookup table 105, which stores a correspondence relationship between the class code Ca and the class code Cb.

This lookup table 105 converts a class code Ca into a class code Cb in such a manner that an addition mean value of items of the pixel data calculated by using coefficient data Wi that corresponds to the class code Ca and the pixel data calculated by using coefficient data Wi that corresponds to the class code Cb may most approach a true value of pixel data that constitutes an HD signal. How to produce this lookup table 105 will be described later.

The apparatus 100 for processing the image signal further comprises a coefficient memory 106. This coefficient memory 106 stores coefficient data Wi of each class, which is used in an estimate equation used by later-described predictive computation circuits 108a and 108b. This coefficient data Wi is information used to convert an SD signal into an HD signal.

As described above, to convert the SD signal into the HD signal, it is necessary to obtain four pixels ($y_1$ to $y_4$) of the HD signal for one pixel ($x_0$) of the SD signal. In this case, the four pixels of the HD signal have different shifts in phase with respect to the one pixel of the corresponding SD signal. Therefore, the coefficient memory 106 stores coefficient data Wi for each combination of classes and positions of output pixels (positions of $y_1$ to $y_4$).

Coefficient data Wi stored in this coefficient memory 106 has been obtained by performing learning between a student signal, which is a first learning signal that corresponds to an SD signal, and a teacher signal, which is a second learning signal that corresponds to an HD signal, by use of such a portion of the dynamic range as to satisfy a relationship of DR≧Th. How to produce this coefficient data Wi will be described later.

The coefficient memory 106 is supplied as read address information the class code Ca output from the above-described class categorization circuit 103 and the class code Cb output from the above-described lookup table 105. The coefficient memory 106 outputs coefficient data Wi-a of a class indicated by the class code Ca and coefficient data Wi-b of a class indicated by the class code Cb. This coefficient memory 106 constitutes first coefficient data generation means and second coefficient data generation means.

Figure 5:
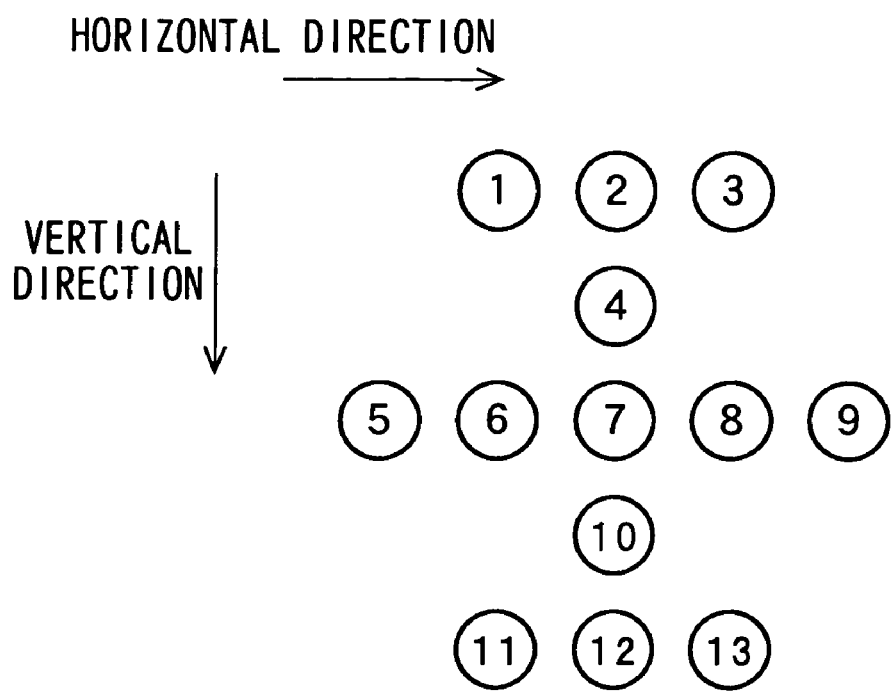
FIG. 5 is a block diagram showing a position of a prediction tap.
Figure 13:
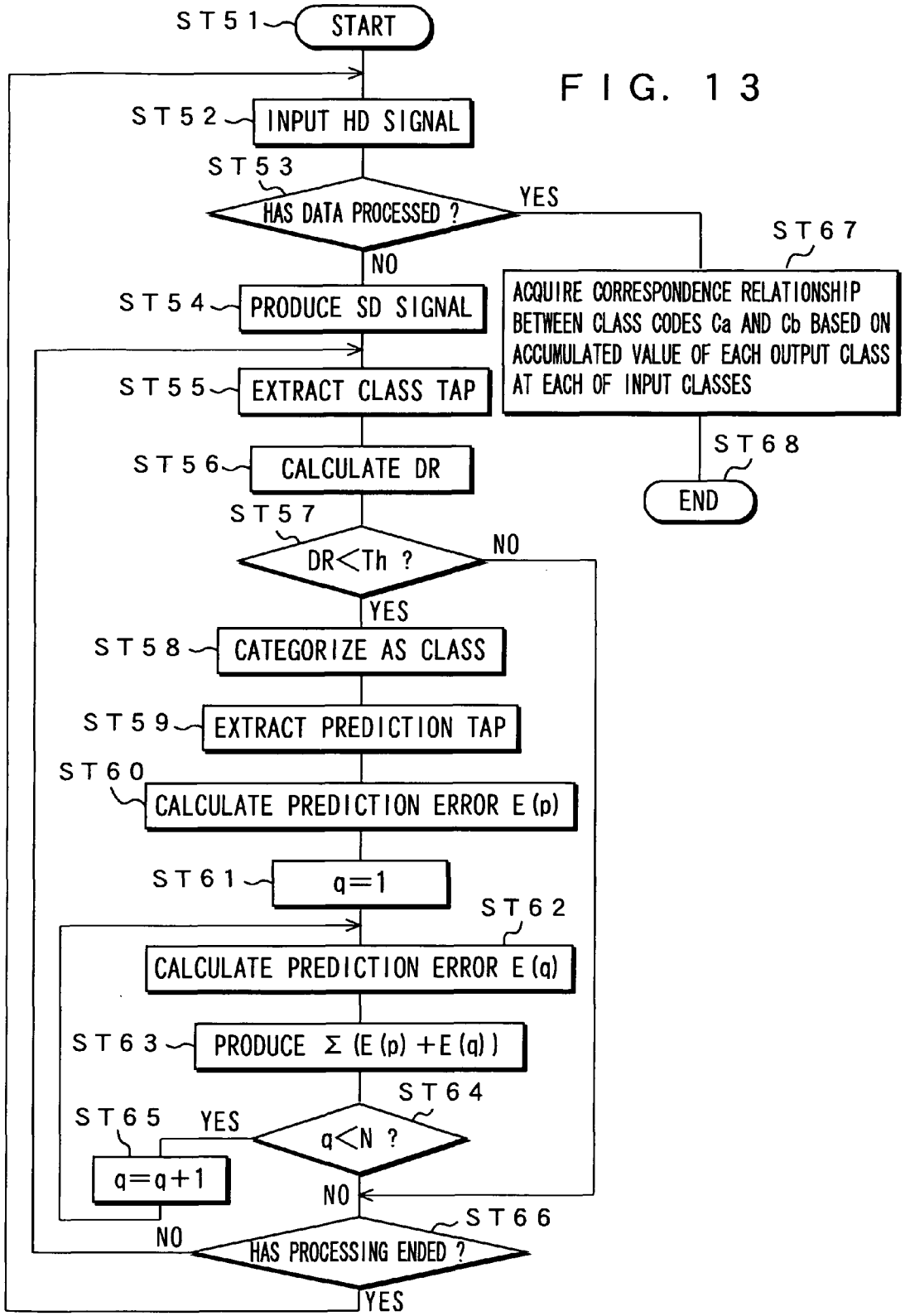
FIG. 13 is a flowchart showing lookup table production processing.

The apparatus 100 for processing the image signal further comprises a prediction tap extraction circuit 107 for extracting as a prediction tap multiple items of pixel data located in a periphery of a target position in the SD signal input to the input terminal 101 based on this SD signal. In the present embodiment, for example, as shown in FIG. 3B, 13 items of SD pixel data located in a periphery of a target position in an SD signal are extracted as a prediction tap. FIG. 5 indicates a tap position of this prediction tap.

The apparatus 100 for processing the image signal further comprises predictive computation circuits 108a and 108b as first and second computation means, respectively. These predictive computation circuits 108a and 108b obtain items of pixel data $y_{1-a}$ to $y_{4-a}$ and $y_{1-b}$ to $y_{4-b}$ based on an estimate equation (1) from pixel data xi extracted as prediction tap by the prediction tap extraction circuit 107 and items of coefficient data Wi-a and Wi-b output from the coefficient memory 106, respectively. In this Equation (1), n indicates the number of items of the pixel data that constitute the prediction tap and n=13 in the present embodiment. It is to be noted that one computation circuit may be adapted to serve as both of the prediction computation circuits 108a and 108b.

$$Y = \sum_{i=1}^{n} Wi \cdot xi \qquad \text{Equation (1)}$$

As described above, to convert an SD signal into an HD signal, it is necessary to obtain four pixels of the HD signal for one pixel of the SD signal. Therefore, these predictive computation circuits 108a and 108b each produce four items of pixel data $y_1$ to $y_4$ for each target position in the SD signal.

That is, these predictive computation circuits 108a and 108b are supplied with pixel data xi as prediction tap that corresponds to a target position in the SD signal from the prediction tap extraction circuit 107 and items of coefficient data Wi-a and Wi-b of the above-described four output pixels from the coefficient memory 106, respectively. Then, these predictive computation circuits 108a and 108b obtain four items of pixel data $y_{1-a}$ to $y_{4-a}$ and $y_{1-b}$ to $y_{4-b}$, respectively and individually, by the above-described Equation (1).

The apparatus 100 for processing the image signal further comprises an adder 109. This adder 109 is controlled in its operation based on the area information AR obtained by the DR processing circuit 104. That is, the adder 109 outputs four items of pixel data $y_{1-a}$ to $y_{4-a}$ obtained by the predictive computation circuit 108a as four items of pixel data $y_1$ to $y_4$ that constitute the HD signal if the area information AR is "0" and the dynamic range DR is not less than the threshold value Th.

If the area information AR is "1" and the dynamic range DR is less than the threshold value Th, on the other hand, the adder 109 outputs an addition mean value $(y_{1-a}+y_{1-b})/2$ through $(y_{4-a}+y_{4-b})/2$ of four items of pixel data $y_{1-n}$ to $y_{4-n}$ obtained by the predictive computation circuit 108a and four items of pixel data $y_{1-b}$ to $y_{4-b}$ obtained by the predictive computation circuit 108b as four items of pixel data $y_1$ to $y_4$ that constitute the HD signal.

The apparatus 100 for processing the image signal further comprises a post-processing circuit 110 for obtaining the HD signal by linear-serializing four items of pixel data $y_1$ to $y_4$ that constitute the HD signal, which correspond to each of the target positions in the SD signal, serially output by the adder 109 and an output terminal 111 for outputting this HD signal.

The following will describe operations of the apparatus 100 for processing the image signal as shown in FIG. 1.

An SD signal input to the input terminal 101 is supplied to the class tap extraction circuit 102. This class tap extraction circuit 102 extracts as a class tap multiple items of pixel data located in a periphery of a target position in the SD signal based on this SD signal (see FIG. 3A). This class tap is supplied to the class categorization circuit 103 and the DR processing circuit 104.

The class categorization circuit 103 performs data compression processing such as ADRC processing on each of the items of pixel data contained in a class tap, to obtain a class code Ca as a first class code that indicates a class of this class tap. This class code Ca is supplied as read address information to the lookup table 105 and the coefficient memory 106.

Further, the DR processing circuit 104 detects dynamic range DR=MAX−MIN, which is a difference between a maximum value MAX and a minimum value MIN of the items of pixel data contained in the class tap and, if this dynamic range DR is not less than a threshold value Th, outputs "0" as area information AR and, otherwise, outputs "1" as the area information AR. This area information AR is supplied as an operation control signal to the lookup table 105 and the adder 109.

The lookup table 105 becomes active if the area information AR is "1", that is, the dynamic range DR is less than the threshold value Th, to output a class code Cb as a second class code that corresponds to the class code Ca obtained by the class categorization circuit 103. This class code Cb is supplied as read address information to the coefficient memory 106.

When the class code Ca is supplied to the coefficient memory 106 as read address information, coefficient data Wi-a of four output pixels that corresponds to a class indicated by the class code Ca is read from this coefficient memory 106 and supplied to the predictive computation circuit 108a. Similarly, when the class code Cb is supplied to the coefficient memory 106 as read address information, coefficient data Wi-b of four output pixels that corresponds to a class indicated by the class code Cb is read from this coefficient memory 106 and supplied to the predictive computation circuit 108b.

Further, the SD signal input to the input terminal 101 is supplied to the predictive tap extraction circuit 107. This predictive tap extraction circuit 107 extracts as a prediction tap multiple items of pixel data located in a periphery of a target position in the SD signal based on this SD signal (see FIG. 3B). Pixel data xi as this prediction tap is supplied to the predictive computation circuits 108a and 108b.

The predictive computation circuit 108a uses the pixel data xi and the coefficient data Wi-a to calculate four items of pixel data $y_{1-a}$ to $y_{4-a}$ that correspond to the target position in the SD signal based on the above-described Equation (1). Similarly, the predictive computation circuit 108b uses the pixel data xi and the coefficient data Wi-b to calculate four items of pixel data $y_{1-b}$ to $y_{4-b}$ that correspond to the target position in the SD signal based on the above-described Equation (1). The items of pixel data $y_{1-a}$ to $y_{4-a}$ and $y_{1-b}$ to $y_{4-b}$ calculated by these predictive computation circuits 108a and 108b, respectively, are supplied to the adder 109.

The adder 109 outputs four items of pixel data $y_{1-a}$ to $y_{4-a}$ obtained by the predictive computation circuit 108a as four items of pixel data $y_1$ to $y_4$ that constitute the HD signal if the area information AR is "0" and the dynamic range DR is not less than the threshold value Th. If the area information AR is "1" and the dynamic range DR is less than the threshold value Th, on the other hand, the adder 109 outputs an addition mean value $(y_{1-b}+y_{1-b})/2$ through $(y_{4-a}+y_{4-b})/2$ of four items of pixel data $y_{1-a}$ to $y_{4-a}$ obtained by the predictive computation circuit 108a and four items of pixel data $y_{1-b}$ to $y_{4-b}$ obtained by the predictive computation circuit 108b as four items of pixel data $y_1$ to $y_4$ that constitute the HD signal.

The four items of pixel data $y_1$ to $y_4$ that constitute the HD signal and are serially output from this adder 109 are supplied to the post-processing circuit 110. This post-processing circuit 110 obtains an HD signal by linear-serializing four items of pixel data $y_1$ to $y_4$, which constitute the HD signal and are serially supplied from the adder 109, corresponding to each of the target positions in the SD signal. This HD signal is output to the output terminal 111.

If the area information AR is "0", that is, if the dynamic range DR is not less than the threshold value Th, the above-described apparatus 100 for processing the image signal outputs items of pixel data $y_{1-a}$ to $y_{4-a}$ calculated by using coefficient data Wi-a obtained so as to correspond to the class code Ca as items of pixel data $y_1$ to $y_4$ that constitute the HD signal.

In this case, as described above, the coefficient data Wi-a has been obtained by performing learning between a student signal (first learning signal) that corresponds to the SD signal and a teacher signal (second learning signal) that corresponds to the HD signal by using such a portion of the dynamic range DR as to be not less than the threshold value Th, thereby enabling accurately to be obtained items of pixel data $y_1$ to $y_4$ that constitute the HD signal.

Further, in the above-described apparatus 100 for processing the image signal, if the area information AR is "1", that is, the dynamic range DR is less than the threshold value Th, an addition mean value $(y_{1-a}+y_{1-b})/2$ through $(y_{4-a}+y_{4-b})/2$ of items of pixel data $y_{1-a}$ to $y_{4-a}$ obtained by using the coefficient data Wi-a obtained so as to correspond to the class code Ca and items of pixel data $y_{1-b}$ to $y_{4-b}$ calculated by using the coefficient data Wi-b obtained so as to correspond to the class code Cb obtained by converting this class code Ca is output as items of pixel data $y_1$ to $y_4$ that constitute the HD signal.

In this case, the class code Ca is converted into the class code Cb in such a manner that the above addition mean value $(y_{1-a}+y_{1-b})/2$ through $(y_{4-a}+y_{4-b})/2$ may most approach a true value of the items of pixel data $y_1$ to $y_4$ that constitute the HD signal, thereby enabling accurately to be obtained the items of pixel data $y_1$ to $y_4$ that constitute the HD signal.

Therefore, by the above-described apparatus 100 for processing the image signal, it is possible to well obtain items of pixel data $y_1$ to $y_4$ that constitute the HD signal no matter whether the dynamic range DR is large or small. This apparatus 100 for processing the image signal can be applied to an apparatus for outputting an image signal, etc., for example, a TV receiver and an image signal reproduction apparatus.

The following will describe a method of producing coefficient data Wi (i=1 to n) of each class, which is stored in the coefficient memory 106. This coefficient data Wi is produced by learning.

A learning method will be described below. In the above-described Equation (1), before learning, items of coefficient data $W_1, W_2, W_n$ are undetermined coefficients. Learning is performed on multiple items of signal data for each class. If the number of items of learning data is m, the following Equation (2) is established according to Equation (1). n indicates the number of prediction taps.

$$y_k = W_1 \times x_{k1} + W_2 \times x_{k2} + \ldots + W_n \times x_{kn} (k=1, 2, \ldots, m) \quad \text{Equation (2)}$$

If m>n, items of the coefficient data $W_1, W_2, \ldots, W_n$ are not determined uniquely, so that an element $e_k$ of an error vector e is defined in the following Equation (3), to obtain coefficient data by which $e^2$ in Equation (4) is minimized. The coefficient data is obtained uniquely by the so-called least-squares method.

$$e_k = y_k - \{W_1 \times x_{k1} + W_2 \times x_{k2} + \ldots + W_n \times w_{kn}\} (k=1, 2, \ldots m)$$

Equation (3)

$$e^2 = \sum_{k=1}^{m} e_k^2$$

Equation (4)

By an actual calculation method of obtaining the coefficient data by which $e^2$ in Equation (4) is minimized, first, as shown in Equation (5), $e^2$ can be partial-differentiated by using coefficient data Wi (i=1 to n), to obtain such coefficient data Wi as to reduce the partial-differentiated value to 0.

$$\frac{\partial e^2}{\partial Wi} = \sum_{k=1}^{m} 2\left(\frac{\partial ek}{\partial Wi}\right) e_k = \sum_{k=1}^{m} 2x_{ki} \cdot e_k$$

Equation (5)

By defining $x_{ji}$ and $y_i$ as given in Equations (6) and (7), the Equation (5) can be written in a form of a determinant of Equation (8). This Equation (8) is a normal equation for calculating coefficient data. By solving this normal equation by a generic solution such as a sweeping-out (Gauss-Jordan elimination) method, items of the coefficient data Wi (i=1 to n) can be obtained.

$$X_{ji} = \sum_{p=1}^{m} xpi \cdot xpj$$

Equation (6)

$$Yi = \sum_{k=1}^{m} xki \cdot yk$$

Equation (7)

$$\begin{bmatrix} X_{11} & X_{12} & \cdots & X_{1n} \\ X_{21} & X_{22} & \cdots & X_{2n} \\ \cdots & \cdots & \cdots & \cdots \\ X_{n1} & X_{n2} & \cdots & X_{nn} \end{bmatrix} \begin{bmatrix} W_1 \\ W_2 \\ \cdots \\ W_n \end{bmatrix} = \begin{bmatrix} Y_1 \\ Y_2 \\ \cdots \\ Y_n \end{bmatrix}$$

Equation (8)

Figure 6:
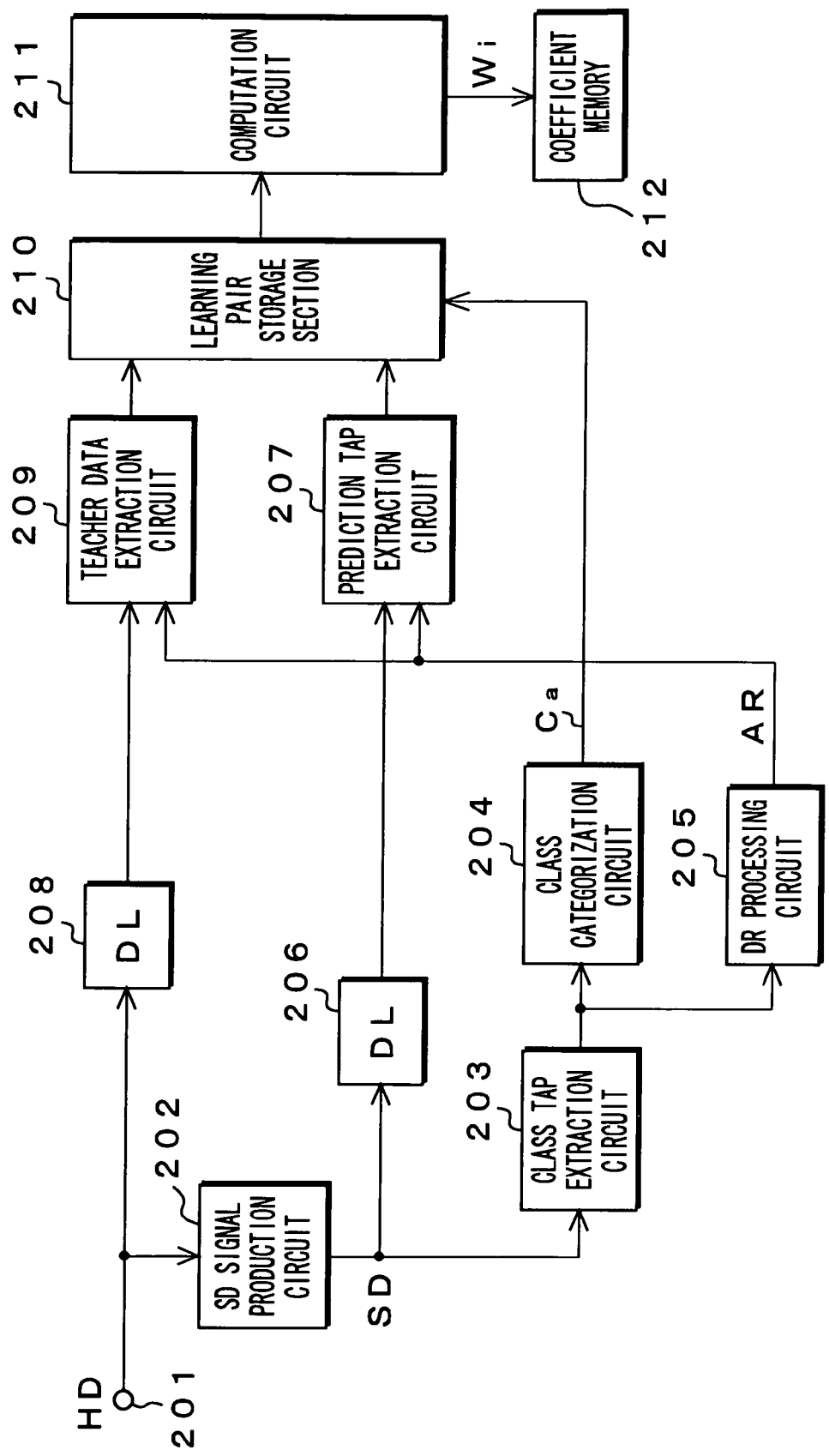
FIG. 6 is a block diagram showing a configuration of an apparatus for producing coefficient data.

FIG. 6 shows a configuration of an apparatus 200 for producing coefficient data that produces coefficient data Wi to be stored in the coefficient memory 106 shown in FIG. 1.

This apparatus 200 for producing the coefficient data comprises an input terminal 201 to which an HD signal is input as a teacher signal, which is a second learning signal, and an SD signal production circuit 202 for horizontal and vertical thinning processing on this HD signal to thereby obtain an SD signal as a student signal, which is a first learning signal.

The apparatus 200 for producing the coefficient data further comprises a class tap extraction circuit 203 for extracting as a class tap multiple items of pixel data located in a periphery of a target position in the SD signal output from the SD signal production circuit 202 based on this SD signal. This class tap extraction circuit 203 is configured similar to the class tap extraction circuit 102 in the above-described apparatus 100 for processing the image signal shown in FIG. 1.

The apparatus 200 for producing the coefficient data further comprises a class categorization circuit 204 for categorizing a class tap extracted by the class tap extraction circuit 203 into any one of a plurality of classes based on this class tap, to obtain a class code Ca indicative of a class of this class tap. This class categorization circuit 204 is configured similar to the class categorization circuit 103 in the above-described apparatus 100 for processing the image signal shown in FIG. 1.

The apparatus 200 for producing the coefficient data further comprises a dynamic range processing circuit (DR processing circuit) 205. This DR processing circuit 205 is configured similar to the DR processing circuit 104 in the above-described apparatus 100 for processing the image signal shown in FIG. 1 and, if DR≧Th, outputs "0" as area information AR and, otherwise, outputs "1" as the area information AR.

The apparatus 200 for producing the coefficient data further comprises a delay circuit 206 for time-adjusting an SD signal output from the SD signal production circuit 202 and a prediction tap extraction circuit 207 for extracting as a prediction tap multiple items of pixel data located in a periphery of a target position in this SD signal output from this delay circuit 206 based on this SD signal. This prediction tap extraction circuit 207 is configured similar to the prediction tap extraction circuit 107 in the above-described apparatus 100 for processing the image signal shown in FIG. 1.

This prediction tap extraction circuit 207 is controlled in its operation based on area information obtained by the DR processing circuit 205. That is, the prediction tap extraction circuit 207 extracts a prediction tap if the area information AR is "0", that is, if a dynamic range DR is not less than a threshold value Th, and does not extract it if the area information is "1", that is, if the dynamic range DR is less than the threshold value Th.

The apparatus 200 for producing the coefficient data further comprises a delay circuit 208 for time-adjusting the HD signal input to the input terminal 201 and a teacher data extraction circuit 209 for extracting as teacher data four items of pixel data that constitute an HD signal corresponding to a target position in an SD signal based on the HD signal output from this delay circuit 208.

This teacher data extraction circuit 209 is also controlled in its operation based on the area information obtained by the DR processing circuit 205. That is, the teacher data extraction circuit 209 extracts teacher data if the area information AR is "0", that is, if the dynamic range DR is not less than the threshold value Th, while it does not extract the teacher data if the area information AR is "1", that is, if the dynamic range DR is less than the threshold value Th.

In this case, corresponding to a target position in the SD signal, one learning pair data is configured between a prediction tap extracted by the prediction tap extraction circuit 207 and teacher data extracted by the teacher data extraction circuit 209. As described above, only if the dynamic range DR is not less than the threshold value Th, a prediction tap and teacher data are extracted as described above to thereby perform learning by using only such a portion of the dynamic range DR as to be not less than the threshold value Th.

The apparatus 200 for producing the coefficient data further comprises a learning pair storage section 210. This learning pair storage section 210 stores, for each class, as learning pair data a prediction tap and teacher data that are extracted respectively by the prediction tap extraction circuit 207 and the teacher data extraction circuit 209 corresponding to each target position in the SD signal based on a class code Ca obtained by the class categorization circuit 204.

The apparatus 200 for producing the coefficient data further comprises a computation circuit 211 for obtaining coefficient data Wi of each class. This computation circuit 211 uses multiple items of learning pair data stored in the learning pair storage section 210, to thereby produce a normal equation (see Equation (8)) for calculating coefficient data Wi for each class. It is to be noted that in this case, the computation circuit 211 produces a normal equation for each output pixel position (position of $y_1$ to $y_4$). That is, the computation circuit 211 produces a normal equation for each combination of classes and output pixel positions. Further, this computation circuit 211 calculates coefficient data Wi for each combination of classes and output pixel positions by solving each normal equation.

The apparatus 200 for producing the coefficient data further comprises a coefficient memory 212 for storing coefficient data Wi obtained by the computation circuit 211.

The following will describe operations of the apparatus 200 for producing the coefficient data shown in FIG. 6.

An HD signal as a teacher signal is input to the input terminal 201. The SD signal production circuit 202 performs horizontal and vertical thinning processing on this HD signal, to produce an SD signal as a student signal.

The SD signal obtained by the SD signal production circuit 202 is supplied to the class tap extraction circuit 203. This class tap extraction circuit 203, based on the SD signal, extracts as a class tap multiple items of pixel data located in a periphery of a target position in this SD signal (See FIG. 3A). This class tap is supplied to the class categorization circuit 204 and the DR processing circuit 205.

The class categorization circuit 204 performs data compression processing such as ADRC processing on each of the items of pixel data contained in the class tap, to obtain a class code Ca indicative of a class of this class tap. This class code Ca is supplied to the learning pair storage section 210.

Further, the DR processing circuit 205 detects dynamic range=MAX−MIN, which is a difference between a maximum value MAX and a minimum value MIN of the items of pixel data contained in the class tap, and outputs "0" as area information if this dynamic range DR is not less than a threshold value Th while if this dynamic range DR is less than the threshold value Th, it outputs "1" as the area information AR. This area information AR is supplied as the operation control signal to the prediction tap extraction circuit 207 and the teacher data extraction circuit 209.

Further, the SD signal obtained by the SD signal production circuit 202 is time-adjusted by the delay circuit 206 and then supplied to the prediction tap extraction circuit 207. Only if the dynamic range DR is not less than the threshold value Th, this prediction tap extraction circuit 207, based on the SD signal, extracts as a prediction tap multiple items of pixel data located in a periphery of a target position in this SD signal (see FIG. 3B). This prediction tap is supplied to the learning pair storage section 210.

Further, the HD signal input to the input terminal 201 is time-adjusted by the delay circuit 208 and then supplied to the teacher data extraction circuit 209. Only if the dynamic range DR is not less than the threshold value Th, this teacher data extraction circuit 209, based on the HD signal, extracts as teacher data four items of pixel data that constitute the HD signal corresponding to the target position in the SD signal. This teacher data is supplied to the learning pair storage section 210.

Based on the class code Ca obtained by the class categorization circuit 204, the learning pair storage section 210 stores as learning pair data a prediction tap and teacher data extracted respectively by the prediction tap extraction circuit 207 and the teacher data extraction circuit 209 corresponding to each target position in the SD signal, for each class.

Then, the computation circuit 211 uses multiple items of learning pair data stored in the learning pair storage section 210, to thereby produce a normal equation (see Equation (8)) for calculating coefficient data Wi for each combination of classes and output pixel positions. Furthermore, this computation circuit 211 solves each normal equation to calculate coefficient data Wi for each combination of the classes and the output pixel positions. The coefficient data Wi thus obtained by the computation circuit 211 is stored in a coefficient memory 212.

In such a manner, in the apparatus 200 for producing the coefficient data shown in FIG. 6, it is possible to produce coefficient data Wi, which is used in an estimate equation, for each combination of classes and output pixel positions (positions of $y_1$ to $y_4$) and which is to be stored in the coefficient memory 106 in the apparatus 100 for processing the image signal shown in FIG. 1. In this case, only if the dynamic range DR is not less than a threshold value Th, a prediction tap and teacher data are extracted to obtain learning pair data as described above, so that coefficient data Wi to be produced is based on a result of learning between a student signal (SD signal) and a teacher signal (HD signal) by use of such a portion of the dynamic range as to be not less than the threshold value Th.

Figure 7:
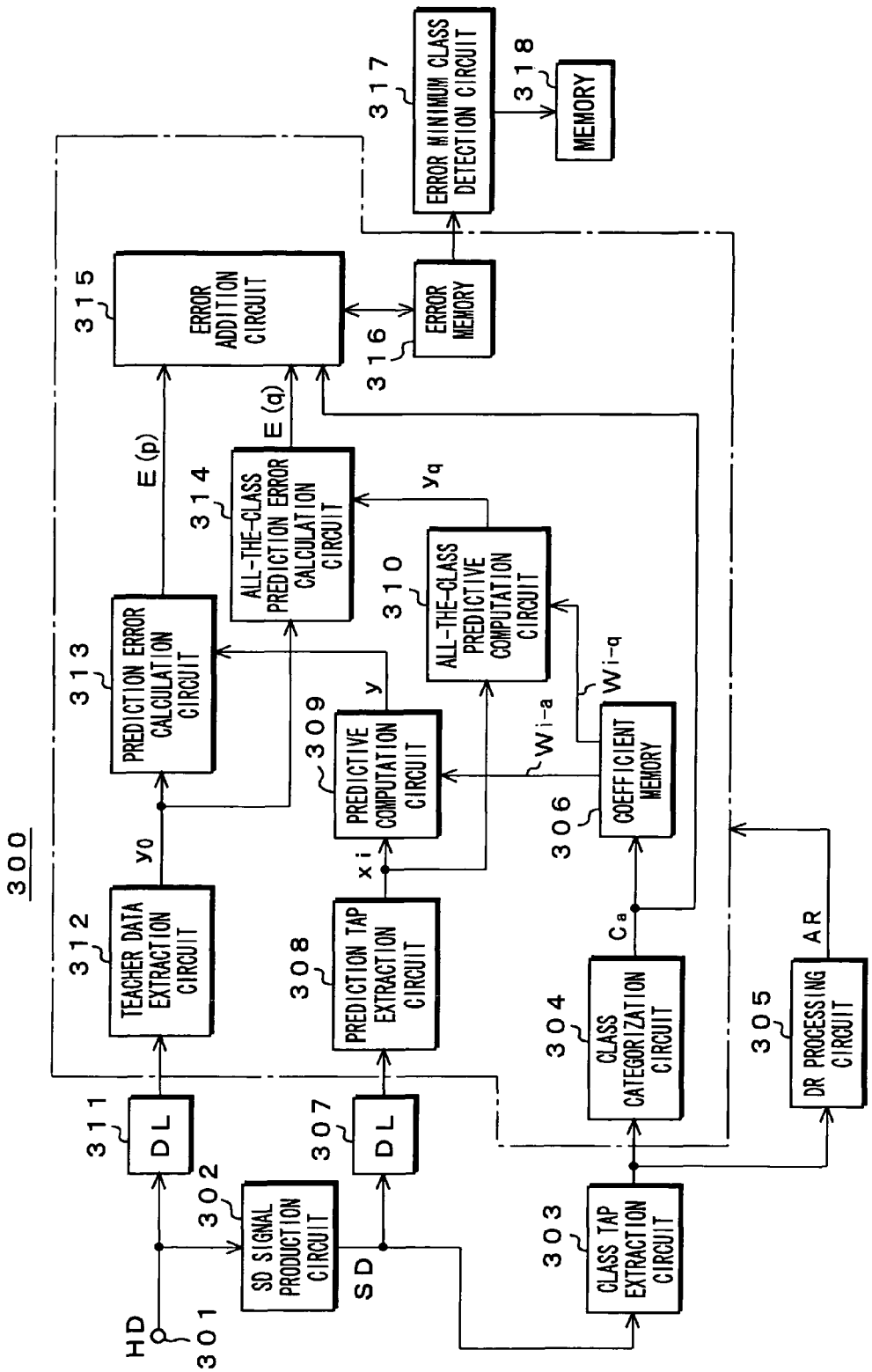
FIG. 7 is a block diagram showing a configuration of an apparatus for producing a lookup table.

The following will describe a method of producing a correspondence relationship between a class code Ca and a class code Cb which are stored in the lookup table 105. FIG. 7 shows a configuration of an apparatus for producing a lookup table (LUT production apparatus 300) that produces the correspondence relationship.

This LUT production apparatus 300 comprises an input terminal 301 to which an HD signal as a teacher signal, which is a second learning signal, is input and an SD signal production circuit 302 for performing horizontal and vertical thinning processing on this HD signal to thereby obtain an SD signal as a student signal, which is a first learning signal.

The LUT production apparatus 300 further comprises a class tap extraction circuit 303 for extracting as a class tap multiple items of pixel data located in a periphery of a target position in the SD signal output from the SD signal production circuit 302 based on this SD signal. This class tap extraction circuit 303 is configured similar to the class tap extraction circuit 102 in the above-described apparatus 100 for processing the image signal shown in FIG. 1.

The LUT production apparatus 300 further comprises a class categorization circuit 304 for categorizing a class tap extracted by the class tap extraction circuit 303 into any one of a plurality of classes based on this class tap, to obtain a class code Ca indicative of a class of this class tap. This class categorization circuit 304 is configured similar to the class categorization circuit 103 in the above-described apparatus 100 for processing the image signal shown in FIG. 1.

The LUT production apparatus 300 further comprises a dynamic range processing circuit (DR processing circuit) 305. This DR processing circuit 305 is configured similar to the DR processing circuit 104 in the above-described apparatus 100 for processing the image signal shown in FIG. 1 and outputs "0" as area information AR if DR<Th while it outputs "1" as the area information AR if DR<Th.

The LUT production apparatus 300 further comprises a coefficient memory 306 for storing coefficient data Wi of each class, which is used in an estimate equation used in later-described predictive computation circuit 309 and all-the-class predictive computation circuit 310. This coefficient data Wi is information to convert an SD signal into an HD signal. Coefficient data Wi stored in this coefficient memory 306 is supposed to be the same as coefficient data Wi to be stored in the coefficient memory 106 in the apparatus 100 for processing the image signal shown in FIG. 1.

That is, the coefficient data Wi to be stored in this coefficient memory 306 is obtained by learning between a student signal that corresponds to the SD signal and a teacher signal that corresponds to the HD signal by use of such a portion of the dynamic range DR as to satisfy DR≧Th. This coefficient data Wi can be produced by using, for example, the apparatus 200 for producing the coefficient data shown in FIG. 6.

The coefficient memory 306 is supplied with the class code Ca, as read address information, output from the above-described class categorization circuit 304. The coefficient memory 306 outputs coefficient data Wi-a of a class indicated by the class code Ca. Further, from this coefficient memory 306, coefficient data Wi-q of each of the classes is serially read by the later-described all-the-class predictive computation circuit 310. It is to be noted that if there are N number of classes in all, q=1 to N. This coefficient memory 306 constitutes first coefficient data generation means and second coefficient data generation means.

The LUT production apparatus 300 further comprises a delay circuit 307 for time-adjusting the SD signal output from the SD signal production circuit 302 and a prediction tap extraction circuit 308 for extracting as a prediction tap multiple items of pixel data located in a periphery of a target position in an SD signal output from this delay circuit 307 based on this SD signal. This prediction tap extraction circuit 308 is configured similar to the prediction tap extraction circuit 107 in the above-described apparatus 100 for processing the image signal shown in FIG. 1.

The LUT production apparatus 300 further comprises a predictive computation circuit 309. This predictive computation circuit 309 obtains pixel data y based on the above-described estimate equation (1) from pixel data xi as the prediction tap extracted by the prediction tap extraction circuit 308 and coefficient data Wi-a output from the coefficient memory 306.

The LUT production apparatus 300 further comprises the all-the-class predictive computation circuit 310. This all-the-class predictive computation circuit 310 serially reads coefficient data Wi-q of each class from the coefficient memory 306, to obtain pixel data $y_q$ (q=1 to N) based on the above-described estimate equation (1) from the pixel data xi as a prediction tap extracted by the prediction tap extraction circuit 308 and this coefficient data Wi-q.

The LUT production apparatus 300 further comprises a delay circuit 311 for time-adjusting the HD signal input to the input terminal 301 and a teacher data extraction circuit 312 for extracting, as teacher data, pixel data that constitutes the HD signal output by this delay circuit 311 and corresponds to a target position in the SD signal, based on this HD signal.

The LUT production apparatus 300 further comprises a prediction error calculation circuit 313. This prediction error calculation circuit 313 calculates an error E (p) of the pixel data y calculated by the predictive computation circuit 309 with respect to the teacher data (true value) extracted by the teacher data extraction circuit 312. In this case, assuming the teacher data to be $y_0$, it can be obtained by E (p)=$y_0$−y. It is to be noted that p indicates a class number of a class indicated by a class code Ca obtained by the class categorization circuit 304.

The LUT production apparatus 300 further comprises an error addition circuit 315 and an error memory 316 as error addition means and error-sum accumulation means, respectively. This error addition circuit 315 adds an error E (q) obtained by the prediction error calculation circuit 313 with an error E (q) (q=1 to N) obtained by the all-the-class prediction error calculation circuit 314, to obtain an error sum (E (p)+E (q)) (q=1 to N) of each class. Further, the error addition circuit 315 adds a value that corresponds to a magnitude of each error sum of each class to an accumulated value of each output class at an input class that corresponds to a class code Ca obtained by the class categorization circuit 304.

The LUT production apparatus 300 further comprises an error addition circuit 315 and an error memory 316 as error addition means and error-sum accumulation means, respectively. This pixel addition circuit 315 adds an error E (p) obtained by the prediction error calculation circuit 313 with an error E (q) (q=1 to N) obtained by the all-the-class prediction error calculation circuit 314, to obtain an error sum (E (p)+E (q)) (q=1 to N) of each class. Further, the error addition circuit 315 adds a value that corresponds to a magnitude of each error sum of each class to an accumulated value of each output class at an input class that corresponds to a class code Ca obtained by the class categorization circuit 304.

In this case, a value that corresponds to a magnitude of the error sum (E (p)+E (q)) is set to, for example, its squared value (E (p)+E (q))$^2$. It is to be noted that the value that corresponds to the magnitude of the error sum (E (p)+E (q)) may be its absolute value |(E (p)+E (q))|.

The error memory 316 stores an accumulated value of each output class at each input class. The error addition circuit 315 reads from the error memory 316 an accumulated value of each output class at an input class p that corresponds to the class code Ca and, adds to the accumulated value of each output class a value that corresponds to a magnitude of a newly obtained error sum of each class, to provide a new accumulated value and then writes back this new accumulated value to the error memory 316.

That is, the error memory 316 stores an accumulated value of each output class at each input class as shown in FIG. 8. To accumulated value of each of the output classes at an input class p that corresponds to a class code Ca, values E1 to EN are added which correspond to magnitudes of the respective error sums of classes newly obtained.

It is to be noted that such components as the class categorization circuit 304, the coefficient memory 306, the prediction tap extraction circuit 308, the predictive computation circuit 309, the all-the-class predictive computation circuit 310, the teacher data extraction circuit 312, the prediction error calculation circuit 313, the all-the-class prediction error calculation circuit 314, the error addition circuit 315, and the error memory 316 perform processing only if area information AR output by the DR processing circuit 305 is "1", that is, a dynamic range DR is less than a threshold value Th. Therefore, values E1 to EN that correspond to the magnitudes of the respective error sums of classes newly obtained are added to accumulated values of output classes at an input class p that corresponds to the above-described class code Ca only if the dynamic range DR is less than the threshold value Th.

The LUT production apparatus 300 further comprises an error minimum class detection circuit 317 as table production means and a memory 318. This detection circuit 317 allocates output class in which an accumulated-value is minimized to each input class based on an accumulated value of each output class at each of the input classes, which is stored in the error memory 316. In such a manner, a correspondence relationship between the input class and the output class is acquired.

For example, it is supposed that an accumulated value of each output class at an input class p is stored in the error memory 316 as shown in FIG. 9. In this case, for the input class p, an accumulated value "25" of an output class q is minimized. Therefore, the input class p is allocated the output class q.

Further, the detection circuit 317, based on the acquired correspondence relationship between the input class and the output class, acquires a correspondence relationship between a class code Ca that corresponds to the input class and a class code Cb that corresponds to the output class (see FIG. 4) and stores it in the memory 318.

The following will describe operations of the LUT production apparatus 300 shown in FIG. 7.

An HD signal is input to the input terminal 301 as a teacher signal. On this HD signal, horizontal and vertical thinning processing is performed by the SD signal production circuit 302, to produce an SD signal as a student signal.

The SD signal obtained by the SD signal production circuit 302 is supplied to the class tap extraction circuit 303. This class tap extraction circuit 303, based on the SD signal, extracts as a class tap multiple items of pixel data located in a periphery of a target position in this SD signal (see FIG. 3A). This class tap is supplied to the class categorization circuit 304 and the DR processing circuit 305.

The DR processing circuit 305 detects a dynamic range DR=MAX−MIN, which is a difference between a maximum value MAX and a minimum value MIX of items of the pixel data contained in the class tap and, if this dynamic range DR is not less than a threshold value Th, outputs "0" as area information AR while if the dynamic range DR is less than the threshold value Th, it outputs "1" as the area information AR.

This area information AR is supplied to such components as the class categorization circuit 304, the coefficient memory 306, the prediction tap extraction circuit 308, the predictive computation circuit 309, the all-the-class predictive computation circuit 310, the teacher data extraction circuit 312, the prediction error calculation circuit 313, the all-the-class prediction error calculation circuit 314, the error addition circuit 315, and the error memory 316 as their operation control signals. Processing by these components is performed only if the area information AR is "1", that is, the dynamic range DR is less than the threshold value Th.

Further, the class categorization circuit 304 performs data compression processing such as ADRC processing on items of the pixel data contained in the class tap, to obtain a class code Ca indicative of a class of this class tap. This class code Ca is supplied to the coefficient memory 306 as read address information and also to the error addition circuit 315.

When the class code Ca is supplied as the read address information to the coefficient memory 306, coefficient data Wi-a that corresponds to a class indicated by the class code Ca is read from this coefficient memory 306 and supplied to the predictive computation circuit 309.

The SD signal obtained by the SD signal production circuit 302 is time-adjusted by the delay circuit 307 and then supplied to the prediction tap extraction circuit 308. This prediction tap extraction circuit 308, based on the SD signal, extracts as a prediction tap multiple items of pixel data located in a periphery of a target position in this SD signal (see FIG. 3B). Pixel data xi as this prediction tap is supplied to the predictive computation circuit 309 and the all-the-class predictive computation circuit 310.

The predictive computation circuit 309 calculates pixel data y that corresponds to the target position in the SD signal based on the above-described equation (1) from the pixel data xi and the coefficient data Wi-a. This pixel data y is supplied to the prediction error calculation circuit 313. The all-the-class predictive computation circuit 310 serially reads coefficient data Wi-q of each class from the coefficient memory 306 and, from this coefficient data Wi-q and the pixel data xi, calculates items of pixel data $y_q$ (q=1 to N) based on the above-described estimate equation (1). This pixel data $y_q$ is supplied to the all-the-class prediction error calculation circuit 314.

Further, the HD signal input to the input terminal 301 is time-adjusted by the delay circuit 311 and then supplied to the teacher data extraction circuit 312. This teacher data extraction circuit 312 extracts, as teacher data $y_0$, pixel data that constitutes the HD signal and corresponds to a target position in the SD signal. This teacher data $y_0$ is supplied to the prediction error calculation circuit 313 and the all-the-class prediction error calculation circuit 314.

The prediction error calculation circuit 313 calculates an error E (p)=$y_0$−y of pixel data y with respect to teacher data (true value) $y_0$. This error E (p) is supplied to the error addition circuit 315. It is to be noted that p indicates a class number of a class indicated by the class code Ca obtained by the class categorization circuit 304 as described above. Further, the all-the-class prediction error calculation circuit 314 calculates errors E (q)=$y_0$−$y_q$ (q=1 to N) of pixel data $y_q$ with respect to teacher data (true value) $y_0$. These errors E (q) (q=1 to N) are supplied to the error addition circuit 315.

The error addition circuit 315 adds the error E (p) with the respective errors E (q) (q=1 to N) to obtain an error sum (E (p)+E (q)) (q=1 to N) of each class. Further, this error addition circuit 315 adds a value that corresponds to a magnitude of the obtained error sum of each class, for example, its squared value (E (p)+E (q))$^2$ to an accumulated value of each output class at an input class that corresponds to the class code Ca obtained by the class categorization circuit 304.

In this case, an accumulated value of each output class at each input class is stored in the error memory 316, from which an accumulated value of each output class at an input class p that corresponds to the class code Ca is read, and to the accumulated value of each output class, a value is added which corresponds to a magnitude of an error sum of each class newly obtained, thereby to provide a new accumulated value, which is then written back to the error memory 316 (See FIG. 8).

In such a manner, processing to add a value that corresponds to a magnitude of an error sum of each value newly obtained to an accumulated value of each output class at an input class p that corresponds to a class code Ca is serially performed corresponding to each target position in the SD signal. It is to be noted that the processing by such components as the class categorization circuit 304, the coefficient memory 306, the prediction tap extraction circuit 308, the predictive computation circuit 309, the all-the-class predictive computation circuit 310, the teacher data extraction circuit 312, the prediction error calculation circuit 313, the all-the-class prediction error calculation circuit 314, the error addition circuit 315, and the error memory 316 is performed only if the area information AR is "1", that is, the dynamic range DR is less than a threshold value Th as described above, so that accumulation processing by the above-described error addition circuit 315 is performed only if the dynamic range DR is less than the threshold value Th.

The error minimum class detection circuit 317 allocates to each input class an output class in which an accumulated value is minimized based on an accumulated value of each output class at each of the input classes stored in the error memory 316 (see FIG. 9), thereby obtaining a correspondence relationship between the input class and the output class. This detection circuit 317 further acquires a correspondence relationship (see FIG. 4) between a class code Ca that corresponds to an input class and a class code Cb that corresponds to an output class based on an acquired input-class vs.

output class correspondence relationship. This correspondence relationship is stored in the memory 318.

In such a manner, in the LUT production apparatus 300 shown in FIG. 7, it is possible to produce a correspondence relationship between a class code Ca and a class code Cb which are stored in the LUT105 in the apparatus 100 for processing the image signal of FIG. 1. In this case, as described above, to each input class, an output class in which an accumulated value that corresponds to a magnitude of an error sum is minimized is allocated, so that it is possible to convert the class code Ca into the class code Cb in such a manner that an addition mean value of pixel data calculated by using coefficient data Wi that corresponds to the class code Ca and pixel data calculated by using coefficient data Wi that corresponds to the class code Cb may most approach a true value of pixel data that constitutes the HD signal.

Figure 10:
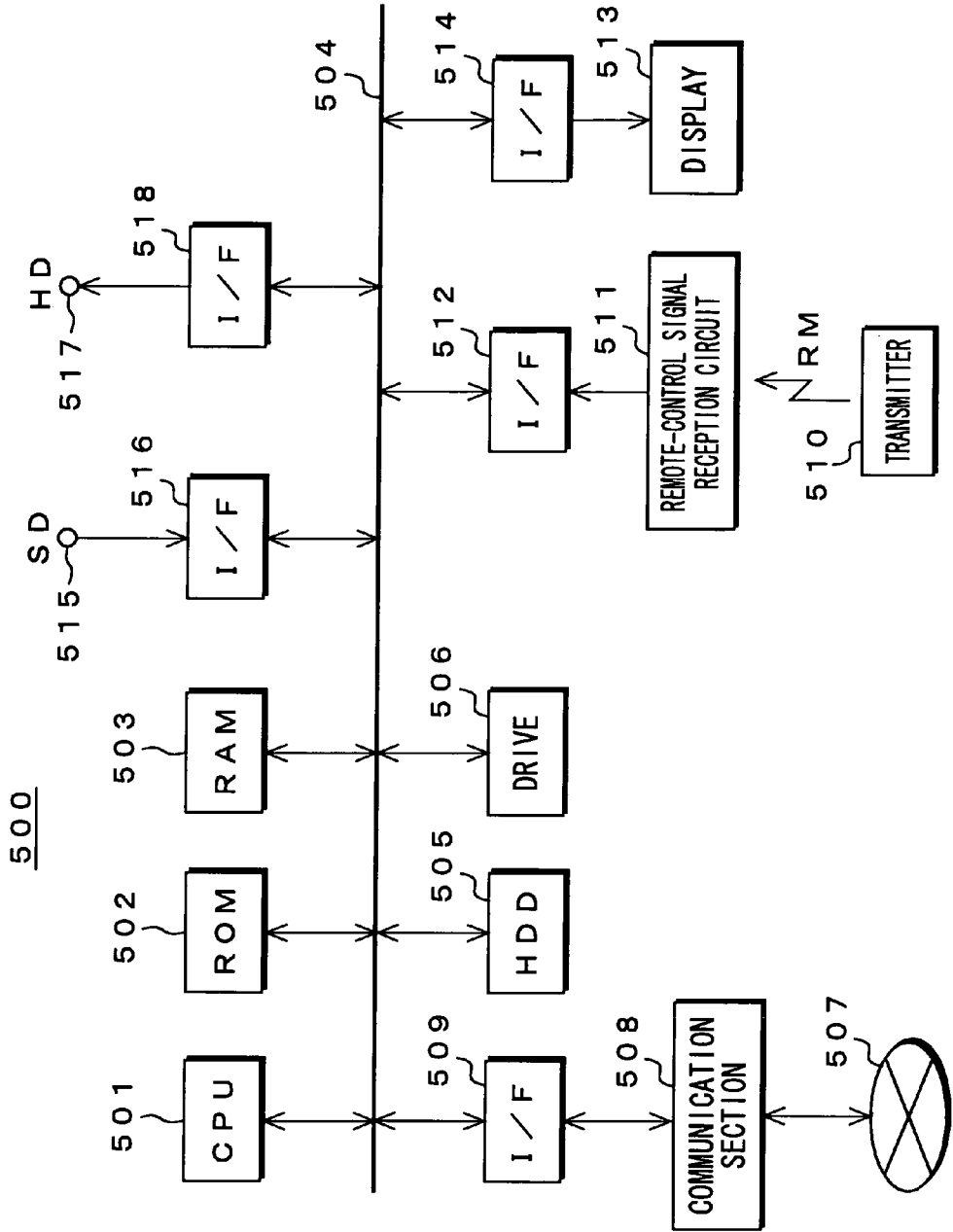
FIG. 10 is a block diagram showing a configuration of an apparatus for processing the image signal with software implementation.

It is to be noted that the processing in the above-described apparatus 100 for processing the image signal of FIG. 1 can be performed by software by using an image signal processing apparatus (computer) 500 like one as shown in FIG. 10, for example.

First, the image signal processing apparatus 500 shown in FIG. 10 will be described. This image signal processing apparatus 500 comprises a CPU501 for controlling operations of the apparatus as a whole, a read only memory (ROM) 502 for storing a control program of this CPU501, coefficient data Wi, a correspondence relationship (lookup table) between a class code Ca and a class code Cb, etc., and a random access memory (RAM) 503 that constitutes a working space for the CPU501. These CPU501, ROM502, and RAM503 are each connected to a bus 504.

The image signal processing apparatus 500 further comprises a hard disc drive (HDD) 505 as an external storage device and a drive 506 for handling a removable recording medium such as a flexible disc, a compact disc read only memory (CD-ROM), a magneto-optical (MO) disc, a digital versatile disc (DVD), a magnetic disk, and a semiconductor memory. These drives 505 and 506 are each connected to the bus 504.

The image signal processing apparatus 500 further comprises a communication section 508 for connecting to a communication network 507 such as the Internet in a wired or wireless manner. This communication section 508 is connected to the bus 504 via an interface 509.

The image signal processing apparatus 500 further comprises a user interface section. This user interface section comprises a remote-control signal reception circuit 511 for receiving a remote-control signal RM from a remote-controlled transmitter 510 and a display 513 constituted of a cathode-ray tube (CRT), a liquid crystal display (LCD), etc. The reception circuit 511 is connected to the bus 504 via an interface 512 and the display 513 is similarly connected to the bus 504 via an interface 514.

The image signal processing apparatus 500 further comprises an input terminal 515 for inputting an SD signal and an output terminal 517 for outputting an HD signal. The input terminal 515 is connected to the bus 504 via an interface 516 and the output terminal 517 is similarly connected to the bus 504 via an interface 518.

It is to be noted that instead of storing the control program etc. in the ROM502 as described above beforehand, it may be downloaded via the communication section 508 from the communication network 507 such as the Internet for example so that it can be stored in the hard disc drive 505 or the RAM 503 and used. Further, the control program etc. may be provided in a removable recording medium.

Further, instead of inputting via the input terminal 515 an SD signal to be processed, it may be supplied in a removable recording medium or downloaded via the communication section 508 from the communication network 507 such as the Internet. Further, instead of or concurrently with outputting the post-processing HD signal to the output terminal 517, it may be supplied to the display 513 to display an image or stored in the hard disc drive 505 to be sent via the communication section 508 to the communication network 507 such as the Internet.

Figure 11:
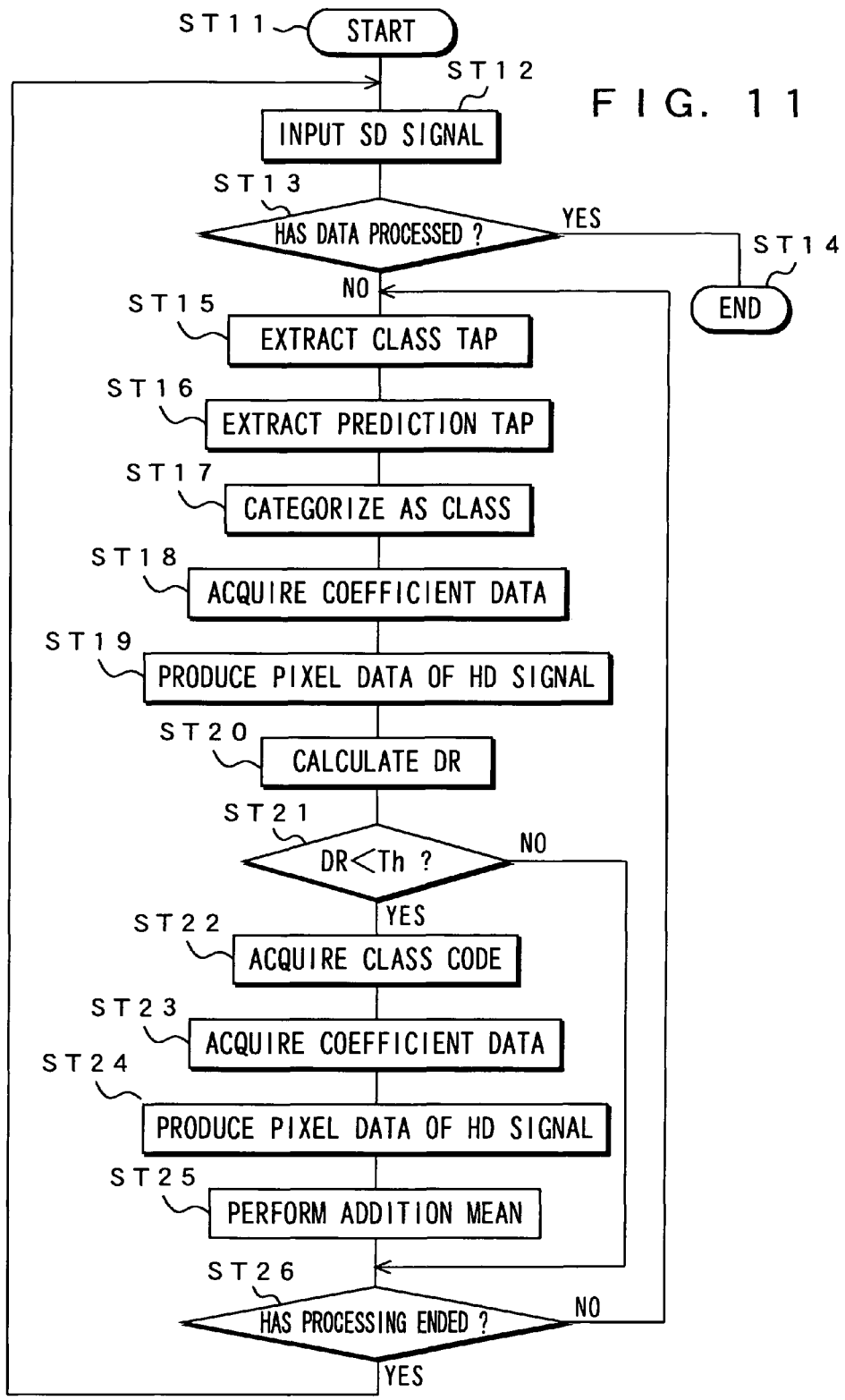
FIG. 11 is a flowchart showing image signal processing.

The following will describe a processing procedure for obtaining an HD signal from an SD signal in the image signal processing apparatus 500 shown in FIG. 10, with reference to a flowchart of FIG. 11.

First, the process starts at step ST11 and, at step ST12, inputs an SD signal of one frame or one field from, for example, the input terminal 515 into the apparatus. The SD signal thus input is temporarily stored in the RAM 503.

At step ST13, the process decides whether all of the frames or fields in the SD signal have been processed. If they have been processed, the process ends the processing at step ST14. Otherwise, if they have not been processed, the process goes to step ST15.

At step ST15, the process extracts as a class tap multiple items of pixel data located in a periphery of a target position in the SD signal input at step ST12 based on this SD signal (see FIG. 3A). Then, at step ST16, the process extracts as a prediction tap multiple items of pixel data located at a periphery of a target position in the SD signal input at step ST12 based on this SD signal (see FIG. 3B).

Next, at step ST17, based on the class tap extracted at step ST15, the process categorizes this class tap into any one of a plurality of classes to thereby obtain a class code Ca. At step ST18, the process acquires, from the ROM 502, coefficient data Wi-a, which is used in an estimate equation, corresponding to the class code Ca acquired at step ST17.

At step ST19, the process uses the pixel data xi extracted as a prediction tap at step ST16 and the coefficient data Wi-a acquired at step ST18, to produce four items of pixel data $y_{1\text{-}n}$ to $y_{4\text{-}n}$ that correspond to a target position in the SD signal based on the estimate equation (see Equation (1)).

Next, at step ST20, based on the class tap extracted at step ST15, the process calculates a dynamic range DR=MAX−MIN, which is a difference between a maximum value MAX and a minimum value MIN of items of the pixel data contained in that class tap. At step ST21, the process decides whether DR<Th, that is, a dynamic range DR is less than a threshold value Th.

If not DR<Th, that is, if the dynamic range DR is not less than the threshold value Th, the process decides that the items of pixel data $y_{1\text{-}n}$ to $y_{4\text{-}n}$ calculated at step ST19 are items of pixel data $y_{1\text{-}a}$ to $y_{4\text{-}a}$ that constitute the HD signal and goes to step ST26. If DR<Th, on the other hand, the process goes to step ST22.

AT this step ST22, the process converts the class code Ca acquired at step ST17 into a class code Cb according to a correspondence relationship between the class codes Ca and Cb stored in the ROM 502. At step ST23, the process acquires, from the ROM 502, coefficient data Wi-b, which is used in the estimate equation, corresponding to the class code Cb obtained by conversion at step ST22.

At step ST24, the process uses the pixel data xi as a prediction tap extracted at step ST16 and the coefficient data Wi-b acquired at step ST23, to produce four items of pixel data $y_{1\text{-}n}$ to $y_{4\text{-}n}$ that correspond to a target position in the SD signal based on the estimate equation (see Equation (1)).

Next, at step ST25, the process obtains an addition mean value $(y_{1-a}+y_{1-b})/2$ through $(y_{4-a}+y_{4-b})/2$ of four items of pixel data $y_{1-a}+y_{4-a}$ calculated at step ST19 and four items of pixel data $y_{1-b}+y_{4-b}$ calculated at step ST24 and decides this as items of pixel data $y_1$ to $y_4$ that constitute the HD signal and then goes to step ST26.

At step ST26, the process decides whether the processing to obtain the pixel data of the HD signal has ended over all of regions of the pixel data of the one frame or one field of the SD signal input at step ST12. If it has ended, the process returns to step ST12 where processing to input the SD signal of next one frame or one field is shifted. If it has not ended, the process returns to step ST15 where processing on the next target position in the SD signal is shifted.

In such a manner, by performing the processing along the flowchart shown in FIG. 11, it is possible to obtain an HD signal from an SD signal by the same method as that in the apparatus 100 for processing the image signal shown in FIG. 1. The HD signal thus obtained is output to the output terminal 517 or supplied to the display 513 so that an image due to it may be displayed or supplied to the hard disk drive 505 so that it may be recorded.

Although a processing apparatus for it is not shown, the processing in the apparatus 200 for producing the coefficient data shown in FIG. 6 can also be performed by software.

Figure 12:
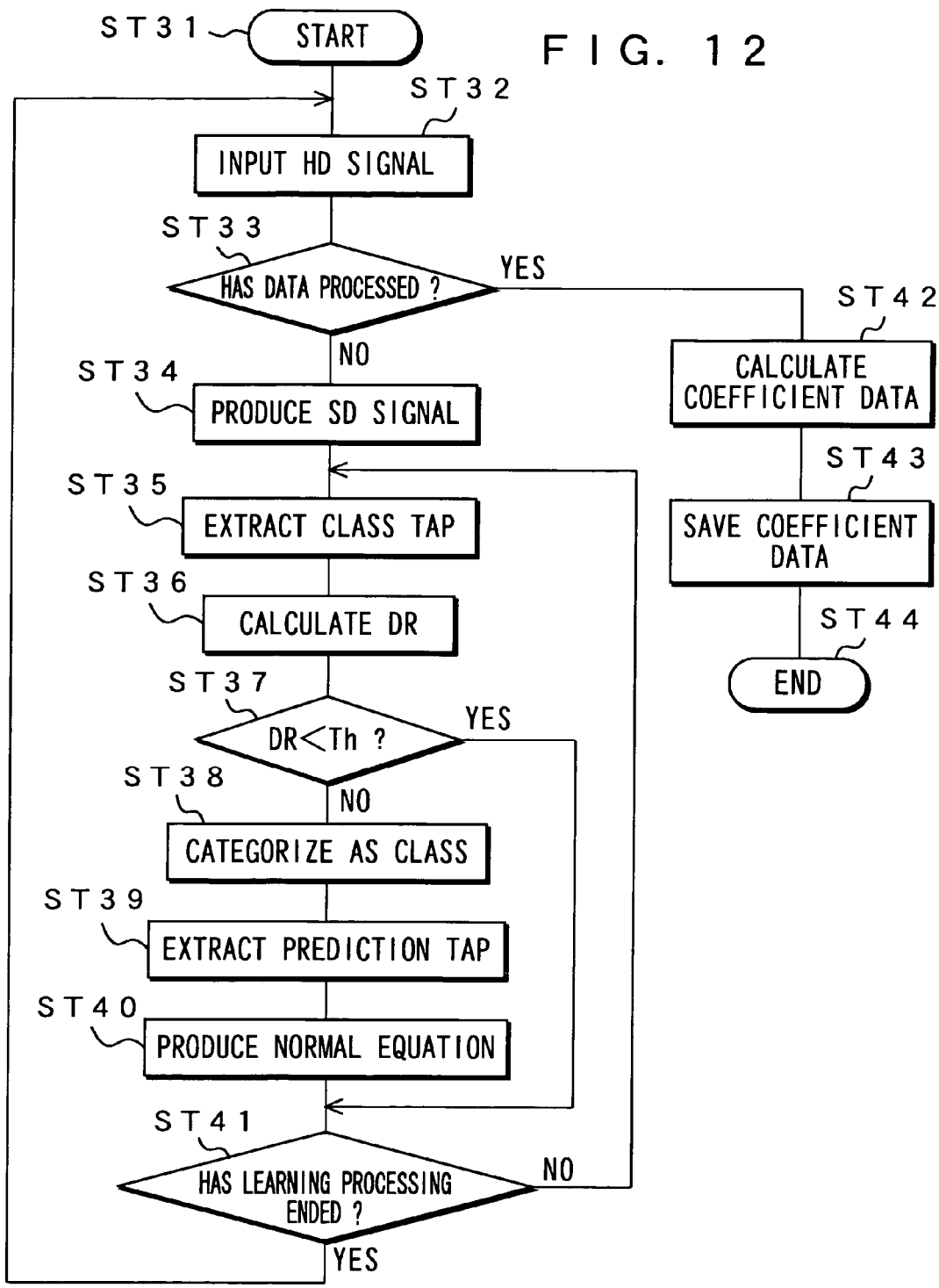
FIG. 12 is a flowchart showing coefficient data production processing.

The following will describe a processing procedure for producing coefficient data Wi with reference to the flowchart of FIG. 12.

First, the process starts at step ST31 and, at step ST32, inputs an HD signal of one frame or one field as a teacher signal. At step ST33, the process decides whether all of the frames or fields in the HD signal have been processed. If they have not been processed, at step ST34 the process produces an SD signal as a student signal from the HD signal input at step ST32.

Next, at step ST35, based on the SD signal produced at step ST34, the process extracts as a class tap multiple items of pixel data located in a periphery of a target position in this SD signal (see FIG. 3A). At step ST36, based on the class tap extracted at step ST35, the process calculates a dynamic range DR=MAX−MIN, which is a difference between a maximum value MAX and a minimum value MIN of items of the pixel data contained in the class tap. At step ST37, the process decides whether DR<Th, that is, whether the dynamic range DR is less than the threshold vale Th.

If DR<Th, that is, if the dynamic range DR is less than the threshold value Th, the process directly goes to step ST41. On the other hand, if not DR<Th, that is, if the dynamic range DR is not less than the threshold value Th, the process goes to step ST38. At this step ST38, based on the class tap extracted at step ST35, the process categorizes this class tap as any one of a plurality of classes to thereby acquire a class code Ca.

Next, at step ST39, based on the SD signal produced at step ST34, the process extracts as a prediction tap multiple items of pixel data located in a periphery of a target position in this SD signal (see FIG. 3B). At step ST40, the process uses the class code Ca acquired at step ST38, pixel data xi of the prediction tap extracted at step ST39, and items of pixel data (teacher data) $y_1$ to $y_4$, that correspond to the target position in the SD signal, of the HD signal input at step ST32 to thereby perform supplementation required to obtain a normal equation given in Equation (8) for each class (see Equations (6) and (7)).

Next, at step ST41, the process decides whether learning processing has ended over all of regions of the pixel data of the one frame or one field in the HD signal input at step ST32. If the learning processing has ended, the process returns to step ST32 where the HD signal of the next one frame or one field is input and then the same processing as above repeats. On the other hand, if the learning processing has not ended, the process returns to step ST35 where processing on the next target position in the SD signal is shifted.

If the processing has ended at the above-described step ST33, at step ST42 the process solves the normal equation produced at step ST40 to obtain coefficient data Wi of each class and saves it in the coefficient memory at step ST43, to end the processing at step ST44.

In such a manner, by performing the processing along the flowchart shown in FIG. 12, it is possible to produce the coefficient data Wi by the same method as that in the apparatus 200 for producing the coefficient data shown in FIG. 6.

Although a processing apparatus for it is not shown, the processing in the LUT production apparatus 300 shown in FIG. 7 can also be performed by software. The following will describe a processing procedure for producing a correspondence relationship between a class code Ca and a class code Cb with reference to a flowchart of FIG. 13.

First, the process starts at step ST51 and, at step ST52, inputs an HD signal of one frame or one field as a teacher signal. At step ST53, the process decides whether all of the frames or fields in the HD signal have been processed. If they have not processed, at step ST54, the process produces an SD signal as a student signal from the HD signal input at step ST52.

Next, at step ST55, based on the SD signal produced at step ST54, the process extracts as a class tap multiple items of pixel data located in a periphery of a target position in this SD signal (see FIG. 3A). At step ST56, based on the class tap extracted at step ST55, the process calculates a dynamic range DR=MAX−MIN, which is a difference between a maximum value MAX and a minimum value MIN of items of the pixel data contained in the class tap. At step ST57, the process decides whether DR<Th, that is, whether the dynamic range DR is less than the threshold vale Th.

If not DR<Th, that is, if the dynamic range DR is not less than a threshold value Th, the process directly goes to step ST66. On the other hand, if DR<Th, the process goes to step ST58. At this step ST58, based on the class tap extracted at step ST55, the process categorizes this class tap as any one of a plurality of classes to thereby acquire a class code Ca. A class number that this class code Ca indicates is supposed to be p.

Next, at step ST59, based on the SD signal produced at step ST54, the process extracts as a prediction tap multiple items of pixel data located in a periphery of a target position in this SD signal (see FIG. 3B). At step ST60, the process uses pixel data xi of the prediction tap extracted at step ST59 and coefficient data Wi-a that corresponds to the class code Ca acquired at step ST58, to obtain pixel data y that corresponds to the target position in the SD signal based on the above-described Equation (1).

Furthermore, at this step ST60, the process extracts, as teacher data $y_0$, pixel data that corresponds to the target position in the SD signal based on the HD signal input at step ST52, to calculate an error E (p)=$y_0$−y of the pixel data y with respect to its teacher data (true value) $y_0$.

Next, at step ST61, the process sets q=1. At step ST62, the process uses pixel data xi of the prediction tap extracted at step ST59 and coefficient data Wi-q that corresponds to a class number q, to obtain pixel data $y_q$ that corresponds to the target position in the SD signal based on the above-described Equation (1). Furthermore, at this step ST62, the process extracts, as teacher data $y_0$, pixel data that corresponds to the target position in the SD signal based on the HD signal input at step ST52, to calculate an error E(q)=$y_0-y_q$ of the pixel data $y_q$ with respect to its teacher data (true value) $y_0$.

Next, at step ST63, the process adds E (p) calculated at step ST60 and an error E (q) calculated at step ST62 to obtain an error sum (E (p)+E (q)). Furthermore, at step ST63, the process adds a value that corresponds to a magnitude of this error sum, for example, a squared-sum (E (p)+E (q))² to an accumulated value of an output class q at an input class p.

Next, at step ST64, the process decides whether q<N. If not q<N, that is, if the processing has ended over all of the output classes, the process goes to step ST66. If q<N and the processing has not ended over all of the output classes, on the other hand, the process increases q by one at step ST65 and returns to step ST62 where an error sum for the next output class is acquired and processing to add it to the relevant accumulated value having the corresponding value is shifted.

At step ST66, the process decides whether the processing has ended over all of regions of pixel data of the one frame or one field in the HD signal input at step ST52. If the processing has ended, the process returns to step ST52 where the HD signal of the next one frame or one field is input and then the same processing as above repeats. If the processing has not ended, on the other hand, the process returns to step ST55 where the processing on the next target position in the SD signal is shifted.

If the processing has ended at the above-described step ST53, at step ST67, the process allocates an output class in which an accumulated value is minimized for each input class based on an accumulated value of each output class at each of the input classes, to acquire a correspondence relationship between the input class and the output class. Furthermore, at this step ST67, the process acquires a correspondence relationship (see FIG. 4) between a class code Ca that corresponds to an input class and a class code Cb that corresponds to an output class based on the acquired correspondence relationship between the input class and the output class and saves it in the memory.

After the processing at step ST67, the process ends at step ST68.

By thus performing the processing along the flowchart shown in FIG. 13, it is possible to produce a correspondence relationship between a class code Ca and a class code Cb by the same method as that in the LUT production apparatus 300 shown in FIG. 7.

Figure 14:
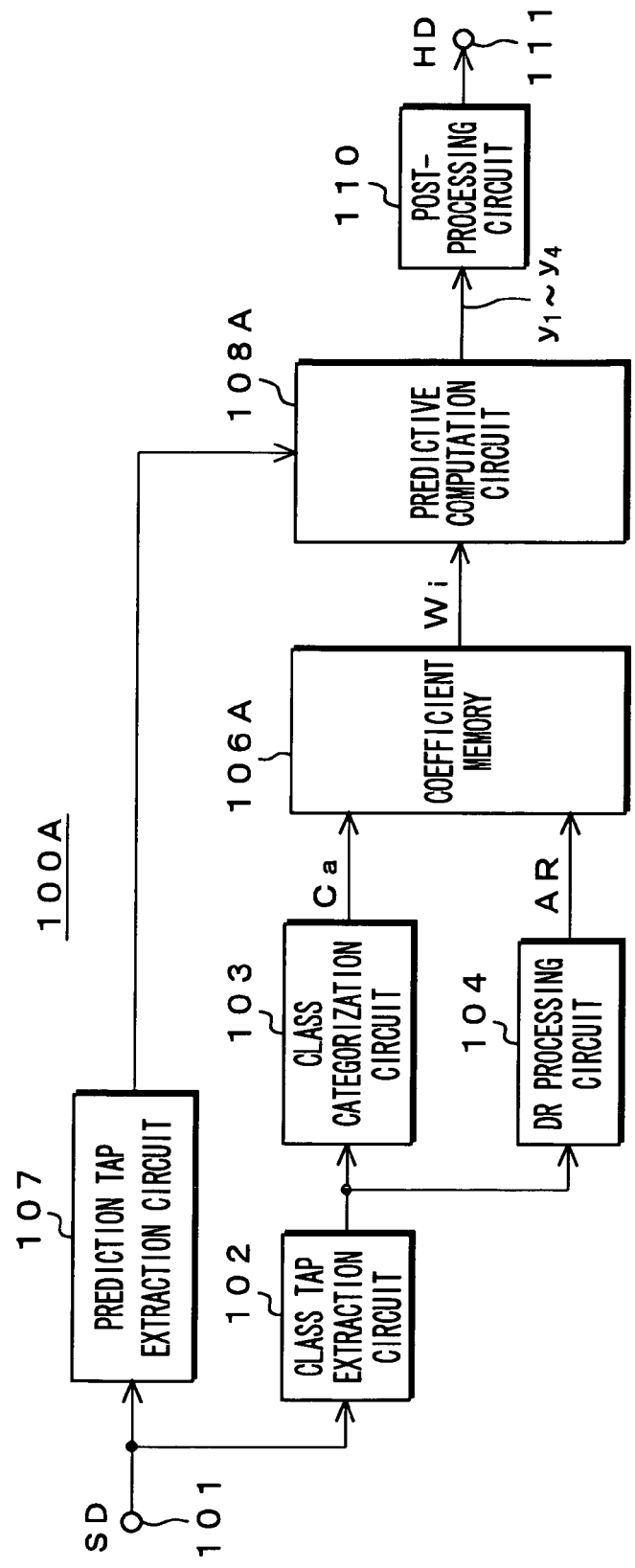
FIG. 14 is a block diagram showing a configuration of an apparatus for processing an image signal according to another embodiment.

The following will describe another embodiment of the present invention. FIG. 14 shows a configuration of an apparatus 100A for processing an image signal according to another embodiment. This apparatus 100A for processing the image signal converts an SD signal as a first information signal into an HD signal as a second information signal. In this FIG. 14, the same components as those in FIG. 1 are indicated by the same symbols and their detailed explanation will be omitted.

This apparatus 100A for processing the image signal comprises a coefficient memory 106A. This coefficient memory 106A stores coefficient data Wis for each class and coefficient data Wic common to the classes that are used in an estimate equation which is used in a later-described predictive computation circuit 108A. Each of the items of coefficient data Wis and Wic is information used to convert an SD signal into an HD signal.

As described above, when converting the SD signal into the HD signal, it is necessary to obtain four pixels (y1 to y4) of the HD signal corresponding to one pixel ($x_0$) of the SD signal (see FIG. 2). In this case, the four pixels of the HD signal have different shifts in phase with respect to the one pixel of the corresponding SD signal. Therefore, the items of coefficient data Wis and Wic are stored in the coefficient memory 106A for each combination of classes and output pixel positions (positions of $y_1$ to $y_4$).

Class-specific coefficient data Wis is the same as the class-specific coefficient data Wi stored in the coefficient memory 106 in the apparatus 100 for processing the image signal shown in FIG. 1. That is, this coefficient data Wi is obtained through learning between a student signal (first learning signal) that corresponds to the SD signal and a teacher signal (second learning signal) that corresponds to the HD signal by use of such a portion of a dynamic range DR as to satisfy a relationship of DR≧Th.

On the other hand, coefficient data Wic common to classes is based on a result of learning, without class categorization, between a student signal (first learning signal) that corresponds to the SD signal and a teacher signal (second learning signal) that corresponds to the HD signal.

For example, the class-specific coefficient data Wis can be produced in the above-described apparatus 200 for producing the coefficient data shown in FIG. 6. The coefficient data Wic common to the classes can be produced by a configuration of this apparatus 200 for producing the coefficient data excluding the components of the class tap extraction circuit 203, the class categorization circuit 204, and the DR processing circuit 205. In this case, in the learning pair storage section 210, multiple items of learning pair data are stored irrespective of class categorization. This computation circuit 211 produces a normal equation which obtains the coefficient data Wic common to classes using the multiple items of learning pair data, so that by solving this equation, this class-common coefficient data Wic can be obtained.

Referring back to FIG. 14, the coefficient memory 106A is supplied with a class code Ca obtained by the above-described class categorization circuit 103 and area information AR obtained by the DR processing circuit 104. If the area information AR is "0" and a dynamic range DR is not less than a threshold value Th, the coefficient memory 106A outputs, as coefficient data Wi, coefficient data Wis of a class indicated by the class code Ca among items of the class-specific coefficient data Wis while if the area information AR is "1" and the dynamic range DR is less than the threshold value Th, it outputs class-common coefficient data Wic as the coefficient data Wi.

The apparatus 100A for processing the image signal further comprises the predictive computation circuit 108A. This predictive computation circuit 108A obtains items of pixel data $y_1$ to $y_4$ that constitute the HD signal and correspond to a target position in the SD signal based on an estimate equation of the above-described Equation (1) from pixel data xi as a prediction tap extracted by the prediction tap extraction circuit 107 and the coefficient data Wi output from the coefficient memory 106A.

The other components of the apparatus 100A for processing the image signal are configured the same manner as those of the apparatus 100 for processing the image signal shown in FIG. 1.

The following will describe operations of the apparatus 100A for processing the image signal shown in FIG. 14.

An SD signal input to the input terminal 101 is supplied to the class tap extraction circuit1 102. Based on the SD signal, this class tap extraction circuit 102 extracts as a class tap multiple items of pixel data located in a periphery of a target position in this SD signal (see FIG. 3A). This class tap is supplied to the class categorization circuit 103 and the DR processing circuit 104.

The class categorization circuit 103 performs data compression processing such as ADRC processing on items of pixel data contained in the class tap, to obtain a class code Ca indicative of a class of this class tap. This class code Ca is supplied as read address information to the coefficient memory 106A.

Further, the DR processing circuit 104 detects a dynamic range DR=MAX−MIN, which is a difference between a maximum value MAX and a minimum value MIN of items of the pixel data contained in the class tap and if this dynamic range DR is not less than the threshold value Th, it outputs "0" as the area information AR and if this dynamic range DR is less than the threshold value Th, on the other hand, it outputs "1" as the area information AR. This area information AR is supplied as read address information to the coefficient memory 106A.

If the area information AR is "0" and the dynamic range DR is not less than the threshold value Th, coefficient data Wis of a class indicated by the class code Ca among items of the class-specific coefficient data Wis is output from the coefficient memory 106A as coefficient data Wi. If the area information AR is "1" and the dynamic range DR is less than the threshold value Th, the class-common coefficient data Wic is output from the coefficient memory 106A as coefficient data Wi. The coefficient data Wi thus output from the coefficient memory 106A is supplied to the predictive computation circuit 108A.

Further, the SD signal input to the input terminal 101 is supplied to the prediction tap extraction circuit 107. Based on the SD signal, this prediction tap extraction circuit 107 extracts as a prediction tap multiple items of pixel data located in a periphery of a target position in this SD signal (see FIG. 3B). Pixel data xi as this prediction tap is supplied to the predictive computation circuit 108A.

The predictive computation circuit 108A calculates four items of pixel data $y_1$ to $y_4$ that constitute the HD signal and correspond to a target position in the SD signal based on Equation (1) using the pixel data xi and the coefficient data Wi. Thus, the four items of pixel data $y_1$ to $y_4$ that constitute the HD signal, correspond to each target position in the SD signal and are calculated serially by the predictive computation circuit 108A are supplied to the post-processing circuit 110.

This post-processing circuit 110 linear-serializes the four items of pixel data $y_1$ to $y_4$ that constitute the HD signal, correspond to the target position in the SD signal, and are serially supplied from the predictive computation circuit 108A, thereby obtaining the HD signal. This HD signal is output to the output terminal 111.

In the above-described apparatus 100A for processing the image signal, if the area information AR is "0", that is, the dynamic range DR is not less than the threshold value Th, the items of pixel data $y_1$ to $y_4$ that constitute the HD signal are obtained by using the coefficient data Wis of a class indicated by a class code Ca. In this case, as described above, the coefficient data Wis is obtained through learning between a student signal (first learning signal) that corresponds to the SD signal and a teacher signal (second learning signal) that corresponds to the HD signal by use of such a portion of the dynamic range DR as to be not less than the threshold value Th, so that the items of pixel data $y_1$ to $y_4$ that constitute the HD signal can be obtained accurately.

Further, in the above-described apparatus 100A for processing the image signal, if the area information AR is "1", that is, the dynamic range DR is less than the threshold value Th, the items of pixel data $y_1$ to $y_4$ that constitute the HD signal are obtained by using the class-common coefficient data Wic. In this case, the coefficient data Wic is based on a result of learning, without class categorization, between a student signal (first learning signal) that corresponds to the SD signal and a teacher signal (second learning signal) that corresponds to the HD signal. Therefore, the coefficient data Wic is an average value of the items of coefficient data of the classes, so that errors of the items of the pixel data $y_1$ to $y_4$ that constitute the HD signal calculated by using this coefficient data Wic with respect to their true values are distributed around error 0.

Therefore, by the above-described apparatus 100A for processing the image signal, it is possible to well obtain the items of pixel data $y_1$ to $y_4$ that constitute an HD signal no matter whether the dynamic range DR is large or small as in the case of the apparatus 100 for processing the image signal shown in FIG. 1. Further, by this apparatus 100A for processing the image signal, the lookup table 105 required in the apparatus 100 for processing the image signal shown in FIG. 1 can be omitted, thereby saving on a memory capacity of the system as a whole.

It is to be noted that the above-described processing in the apparatus 100A for processing the image signal shown in FIG. 14 can be performed by software in the image signal processing apparatus (computer) 500 shown in FIG. 10 for example.

Figure 15:
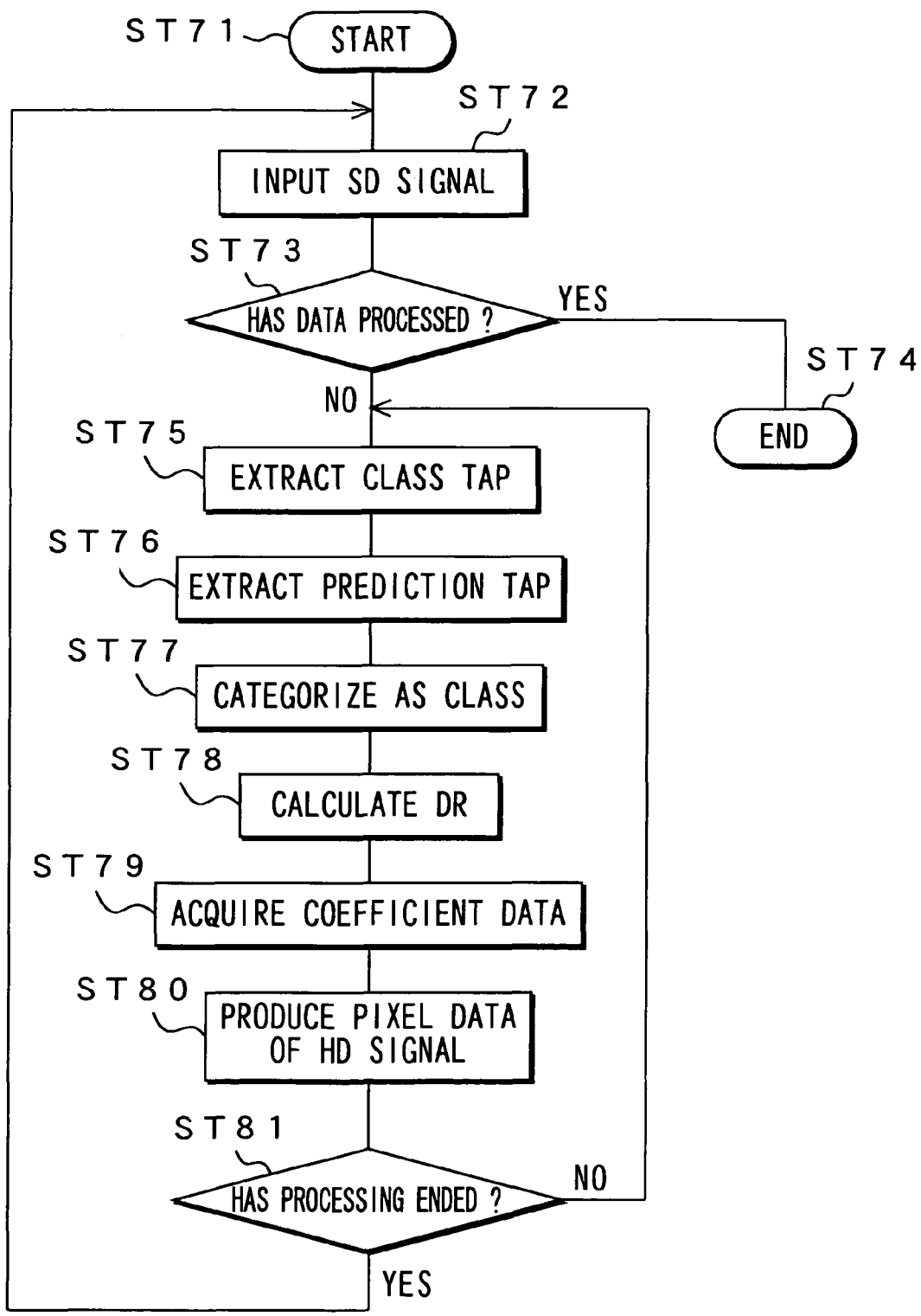
FIG. 15 is a flowchart showing image signal processing.

The following will describe a processing procedure for obtaining an HD signal from an SD signal in the image signal processing apparatus 500 shown in FIG. 9, with reference to a flowchart of FIG. 15.

First, the process starts at step ST71 and, at step ST72, it inputs an SD signal of one frame or one field from, for example, the input terminal 515 into the apparatus. The SD signal thus input is temporarily stored in the RAM 503.

At step ST73, the process decides whether all of the frames or fields of the SD signal are processed. If they are processed, the process ends the processing at step ST74. If they are not processed, on the other hand, the process goes to step ST75.

At step ST75, the process extracts as a class tap multiple items of pixel data located in a periphery of a target position in the SD signal input at step ST72 based on this SD signal (see FIG. 3A). Then, at step ST76, the process extracts as a prediction tap multiple items of pixel data located in a periphery of a target position in the SD signal input at step ST72 based on this SD signal (see FIG. 3B).

Next, at step ST77, based on the class tap extracted at step ST75, the process categorizes this class tap as any one of a plurality of classes, to obtain a class code Ca. At step ST78, based on the class tap extracted at step ST75, the process calculates a dynamic range DR=MAX−MIN, which is a difference between a maximum value MAX and a minimum value MIN of items of the pixel data contained in that class tap.

Next, at step ST79, the process acquires coefficient data Wi based on the class code Ca acquired at step ST77 and the dynamic range DR calculated at step ST78. In this case, if the dynamic range DR is not less than a threshold value Th, from the ROM 502, the process acquires, as coefficient data Wi, coefficient data Wis of a class indicated by the class code Ca among items of the class-specific coefficient data Wis. If the dynamic range DR is less than the threshold value Th, on the other hand, the process acquires class-common coefficient data Wic as coefficient data Wi from the ROM502.

Next, at step ST80, the process produces four items of pixel data $y_1$ to $y_4$ that correspond to a target position in the SD signal based on the estimate equation (see Equation (1)) by using the pixel data xi extracted as the prediction tap at step ST76 and the coefficient data Wi acquired at step ST79.

Next, at step ST81, the process decides whether the processing to obtain the pixel data of the HD signal has ended over all of regions of the pixel data of the one frame or one field in the SD signal input at step ST72. If it has ended, the process returns to step ST72 where processing to input the next one frame or one field of the SD signal is shifted. If it has not ended, on the other hand, the process returns to step ST75 where processing on the next target position in the SD signal is shifted.

In such a manner, by performing the processing along the flowchart shown in FIG. 15, it is possible to obtain the HD signal from the SD signal by the same method as that in the apparatus 100A for processing the image signal shown in FIG. 14.

The following will describe a further embodiment of the present invention. FIG. 16 shows a configuration of an apparatus 100B for processing an image signal according to this further embodiment. In contract to the apparatus 100 for processing the image signal shown in FIG. 1 in which coefficient data Wi of each class is stored in the coefficient memory 106 beforehand, in the apparatus 100B for processing the image signal shown in FIG. 16, ROM stores coefficient seed data, which is coefficient data in a production equation for producing the coefficient data Wi of each class, whereby the coefficient data Wi is produced by using this coefficient seed data. In this FIG. 16, the same components as those in FIG. 1 are indicated by the same symbols and their detailed explanation will be omitted.

This apparatus 100B for processing the image signal comprises an ROM 112. In this ROM 112, coefficient seed data of each class is stored beforehand. This coefficient seed data is coefficient data for a production equation that produces coefficient data Wi to be stored in the coefficient memory 106.

As described above, the predictive computation circuits 108a and 108b compute pixel items of pixel data $y_{1-a}$ to $y_{4-a}$ and $y_{1-b}+y_{4-b}$ by an estimate equation of Equation (1) from the pixel data xi as a prediction tap and items of the coefficient data Wi-a and Wi-b read from the coefficient memory 106.

Items of coefficient data Wi (i=1 to N) used in the estimate equation and to be stored in the coefficient memory 106 are produced by a production equation including parameters r and z as shown in Equation (9). In this equation, r is a parameter which determines resolution and z is a parameter which determines a degree of noise rejection. In the ROM 112, items of coefficient seed data $w_{i0}$ to $w_{i9}$ (i=1 to N), which are items of coefficient data for this production equation, are stored for each combination of classes and output pixel positions (positions of $y_1$ to $y_4$, see FIG. 2). How to produce this coefficient seed data will be described later.

$$Wi = w_{i0} + w_{i1}r + w_{i2}z + w_{i3}r^2 + w_{i4}rz + w_{i5}z^2 + w_{i6}r^3 + w_{i7}r^2z + w_{i8}rz^2 + w_{i9}z^3 \quad \text{Equation (9)}$$

The apparatus 100B for processing the image signal further comprises a coefficient production circuit 113 for producing coefficient data Wi, which is used in an estimate equation and corresponds to the values of the parameters r and z for each combination of classes and output pixel positions based on Equation (9) using coefficient seed data of each class and values of the parameters r and z. Into this coefficient production circuit 113, items of the coefficient seed data wi0 to $w_{i9}$ are loaded from the ROM 112. Further, the parameters r and z are also supplied to this coefficient production circuit 113.

Coefficient data Wi of each class produced by this coefficient production circuit 109 is stored in the above-described coefficient memory 106. The production of the coefficient data Wi in this coefficient production circuit 113 is performed, for example, for each vertical blanking period. Accordingly, even if the values of the parameters r and z are changed by a user operation, it is possible to readily change coefficient data Wi of each class stored in the coefficient memory 106 to a value that corresponds to the values of such the parameters r and z, thereby permitting the user to smoothly adjust the resolution and the degree of noise rejection thereof.

It is to be noted that items of the coefficient seed data $w_{i0}$ to $w_{i9}$ stored in the ROM 112 have been obtained through learning between a student signal (first learning signal) that corresponds to the SD signal and a teacher signal (second learning signal) that corresponds to the HD signal by use of such a portion of a dynamic range DR as to satisfy a relationship of DR≧Th as in the case of the coefficient data Wi which is stored beforehand in the coefficient memory 106 in the above-described apparatus 100 for processing the image signal shown in FIG. 1.

Therefore, similar to the coefficient data Wi which is stored beforehand in the coefficient memory 106 in the apparatus 100 for processing the image signal shown in FIG. 1, the coefficient data Wi to be stored in the coefficient memory 106 in this apparatus 100B for processing the image signal shown in FIG. 16 is also based on a result of learning between a student signal (first learning signal) that corresponds to the SD signal and a teacher signal (second learning signal) that corresponds to the HD signal by use of such a portion of the dynamic range DR as to satisfy the relationship of DR≧Th.

The other components of the apparatus 100B for processing the image signal are configured and operate the same way as those of the apparatus 100 for processing the image signal shown in FIG. 1.

The processing by the apparatus 100B for processing the image signal shown in FIG. 16 can also be realized by software. A processing procedure in this case is roughly the same as that for the image signal processing shown in FIG. 11. However, at steps ST18 and ST23, items of coefficient seed data $w_{i0}$ to $w_{i9}$ that correspond to their respective class codes Ca are used to produce items of coefficient data Wi-a and Wi-b that correspond to parameters r and z that are set by the user.

The following will describe how to produce items of the coefficient seed data $w_{i0}$ to $w_{i9}$ (i=1 to N) of each class, which are stored in the ROM 112. The items of coefficient seed data $w_{i0}$ to $w_{i9}$ are produced by learning. How to learn will be described below.

For ease of explanation, tj (j=0 to 9) is defined as given in Equation (10).

$$t_0 1, t_1=r, t_2=z, t_3=r^2, t_4=rz, t_5=z^2, t_6=r^3, t_7=r^2z, t_8=rz^2, t_9=z^3 \quad \text{Equation (10)}$$

By using this Equation (10), Equation (9) is rewritten as Equation (11).

$$Wi = \sum_{j=0}^{9} W_{ij}t_j \quad \text{Equation (11)}$$

Finally, an undetermined coefficient $w_{ij}$ is obtained by learning. That is, by using multiple items of SD pixel data and HD pixel data for each combination of classes and output pixel positions, a coefficient value that minimizes a square error is determined. This solution employs so-called the least-squares method. Assuming the number of times of learning to be m, a remainder of the k'th learning data (1≦k≦m) to be $e_k$, and a total sum of the square errors to be E, E can be given by Equation (12) based on Equations (1) and (9). In it, $x_{jk}$ indicates the k'th item of pixel data at the i'th prediction tap position of an SD image and $y_k$ indicates pixel data of the corresponding k'th HD image corresponding thereto.

$$E = \sum_{k=1}^{m} e_k^2$$

$$= \sum_{k=1}^{m} [y_k - (W_1 x_{1k} + W_2 x_{2k} + \ldots + W_n x_{nk})]^2$$

$$= \sum_{k=1}^{m} \{y_k - [(t_0 w_{10} + t_1 w_{11} + \ldots + t_9 w_{19}) x_{1k} + \ldots + (t_0 w_{n0} + t_1 w_{n1} + \ldots + t_9 w_{n9})]\}^2$$

$$= \sum_{k=1}^{m} \{y_k - [(w_{10} + w_{11} r + \ldots + w_{19} z^3) x_{1k} + \ldots + (w_{n0} + w_{n1} r + \ldots + w_{n9} z^3) x_{nk}]\}^2$$

Equation (12)

By the solution based on the least-squares method, such $w_{ij}$ is obtained that a partial differentiation by use of $w_{ij}$ in Equation (12) may be 0. This is indicated by Equation (13).

$$\frac{\partial E}{\partial w_{ij}} = \sum_{k=1}^{m} 2\left(\frac{\partial e_k}{\partial w_{ij}}\right) e_k = -\sum_{k=1}^{m} 2 t_j x_{ik} e_k = 0$$

Equation (13)

Similarly, by defining $X_{ipjq}$ and $Y_{ip}$ as in Equations (14) and (15), Equation (13) can be rewritten as Equation (16) by using a matrix.

$$X_{ipjq} = \sum_{k=1}^{m} x_{ik} t_p x_{jk} t_q$$

Equation (14)

$$Y_{ip} = \sum_{k=1}^{m} x_{ik} t_p x_{yk}$$

Equation (15)

$$\begin{bmatrix} x_{1010} & x_{1011} & x_{1012} & \cdots & x_{1019} & x_{1020} & \cdots & x_{10n9} \\ x_{1110} & x_{1111} & x_{1112} & \cdots & x_{1119} & x_{1120} & \cdots & x_{11n9} \\ x_{1210} & x_{1211} & x_{1211} & \cdots & x_{1219} & x_{1220} & \cdots & x_{12n9} \\ \vdots & \vdots & \vdots & \ddots & \vdots & \vdots & \ddots & \vdots \\ x_{1910} & x_{1911} & x_{1912} & \cdots & x_{1919} & x_{1920} & \cdots & x_{19n9} \\ x_{2020} & x_{2011} & x_{2012} & \cdots & x_{2019} & x_{2020} & \cdots & x_{20n9} \\ \vdots & \vdots & \vdots & \ddots & \vdots & \vdots & \ddots & \vdots \\ x_{n910} & x_{n911} & x_{n912} & \cdots & x_{n919} & x_{n920} & \cdots & x_{n9n9} \end{bmatrix} \begin{bmatrix} w_{10} \\ w_{11} \\ w_{12} \\ \vdots \\ w_{19} \\ w_{20} \\ \vdots \\ w_{n9} \end{bmatrix} = \begin{bmatrix} y_{10} \\ y_{11} \\ y_{12} \\ \vdots \\ y_{19} \\ y_{20} \\ \vdots \\ y_{n9} \end{bmatrix}$$

Equation (16)

This Equation (16) is a normal equation for calculating coefficient seed data. By solving this normal equation by a generic solution such as a sweeping-out (Gauss-Jordan elimination) method, items of the coefficient seed data $w_{i0}$ to $w_{i9}$ ($i=1$ to $n$) can be obtained.

FIG. 17 shows a concept of the above-described coefficient seed data production method. From an HD signal as a teacher signal (second learning signal), a plurality of SD signals as a student signal (first learning signal) is produced. It is to be noted that SD signals having different resolutions are produced by changing frequency characteristics of a thinning filter that is used when producing an SD signal from an HD signal.

By using SD signals having different resolutions, items of coefficient seed data each having different resolution-improving effects can be produced. For example, assuming that there are an SD signal from which a more blurred image is obtained and an SD signal from which a less blurred image is obtained, coefficient seed data having larger resolution-improving effects is produced through learning by use of the SD signal for the more blurred image, while coefficient seed data having smaller resolution-improving effects is produced through learning by use of the SD signal for the less blurred image.

Further, by adding noise to each of SD signals having different resolutions, noise-added SD signals are produced. By varying a quantity of noise to be added, SD signals having different noise quantities added thereto are produced, thereby producing items of coefficient seed data having different noise rejection effects. For example, assuming that there are an SD signal to which more noise is added and an SD signal to which less noise is added, coefficient seed data having larger noise rejection effect is produced through learning by use of the SD signal having more noise added thereto, while coefficient seed data having smaller noise rejection effect is produced through learning by use of the SD signal having less noise added thereto.

The quantity of noise to be added is adjusted by varying a value of G if, for example as shown in Equation (17), noise n is added to a pixel value x of an SD signal to thereby produce a pixel value x' of a nose-added SD signal.

$$x' = x + G \cdot n$$

Equation (17)

For example, a parameter r that changes frequency characteristics is varied in nine steps of 0 to 8 and a parameter z that changes the quantity of noise to be added is also varied in nine steps of 0 to 8 to thereby produce a total of 81 species of SD signals. Through learning between the thus produced plurality of SD and HD signals, the coefficient seed data is produced. These parameters r and z correspond to the parameters r and z in the apparatus 100B of FIG. 16 for processing the image signal.

FIG. 18 shows a configuration of the apparatus 200B for producing coefficient seed data that produces items of the coefficient seed data $w_{i0}$ to $w_{i9}$ to be stored in the ROM 112 of FIG. 16. In this FIG. 18, the components that correspond to those in FIG. 6 are indicated by the same symbols and their detailed explanation will be omitted.

The apparatus 200B for producing the coefficient seed data comprises an SD signal production circuit 202B for obtaining an SD signal as a student signal (first learning signal) by performing horizontal and vertical thinning processing on an HD signal as a teacher signal (second learning signal) input to the input terminal 201. This SD signal production circuit 202B is supplied with parameters r and z as a control signal. In accordance with the parameter r, frequency characteristics of the thinning filter used to produce the SD signal from the HD signal are varied. Further, in accordance with the parameter z, the quantity of noise to be added to the SD signal is varied.

The apparatus 200B for producing the coefficient seed data further comprises a learning pair storage section 210B. Based on the class code Ca obtained by the class categorization circuit 204 and the parameters r and z supplied to the SD signal production circuit 202B, this learning pair storage section 210B stores, for each class, as learning pair data, a prediction tap and teacher data that are extracted respectively by the prediction tap extraction circuit 207 and the teacher data extraction circuit 209 corresponding to each target position in the SD signal with them being correlated with values of the parameters r and z.

The apparatus 200B for producing the coefficient seed data further comprises a computation circuit 211B. This computation circuit 211B produces a normal equation (see Equation (16)) for calculating items of the coefficient seed data $w_{i0}$ to $w_{i9}$ for each class using multiple items of learning pair data stored in the learning pair storage section 210B. It is to be noted that in this case, the computation circuit 211B produces a normal equation for each output pixel position (each of the positions of $y_1$ to $y_4$). That is, the computation circuit 211B produces a normal equation for each combination of classes and output pixel positions. Further, this computation circuit 211B calculates items of the coefficient seed data $w_{i0}$ to $w_{i9}$ for each combination of classes and output pixel positions by solving each normal equation.

The other components of the apparatus 200B for producing the coefficient seed data are configured the same way as those of the apparatus 200 for producing the coefficient data shown in FIG. 6.

The following will describe operations of the apparatus 200B for producing the coefficient seed data shown in FIG. 18.

Horizontal and vertical thinning processing is performed by the SD signal production circuit 202B on an HD signal input to the input terminal 201, to produce an SD signal as a student signal. In this case, the SD signal production circuit 202B is supplied with the parameters r and z as the control signal, to serially produce a plurality of SD signals having step-wise changed frequency characteristics and added-noise quantities. The SD signals produced by this SD signal production circuit 202B are supplied to the class tap extraction circuit 203 and also, via the time-adjusting delay circuit 206, to the prediction tap extraction circuit 207.

Operations of the class tap extraction circuit 203, the class categorization circuit 204, the DR processing circuit 205, the teacher data extraction circuit 209, and the prediction tap extraction circuit 207 are the same as those in the apparatus 200 for producing the coefficient data shown in FIG. 6 and so their explanation will be omitted.

The learning pair storage section 210B is supplied with a class code Ca obtained by the class categorization circuit 204, a prediction tap extracted by the prediction tap extraction circuit 207, teacher data extracted by the teacher data extraction circuit 209, and the same parameters r and z as those supplied to the SD signal production circuit 202B.

Then, in this learning pair storage section 210B, a prediction tap and teacher data are stored as learning pair data. In this case, based on the class code Ca and the parameters r and z, each of the items of learning pair data is stored with them being correlated with values of the parameters r and z.

The computation circuit 211B generates a normal equation (see Equation (16)) for calculating items of the coefficient seed data $w_{i0}$ to $w_{i9}$ for each combination of classes and output pixel positions using multiple items of learning pair data stored in the learning pair storage section 210B. Furthermore, this computation circuit 211B solves each normal equation to calculate items of the coefficient seed data $w_{i0}$ to $w_{i9}$ for each combination of the classes and the output pixel positions. Items of the coefficient seed data $w_{i0}$ to $w_{i9}$ thus obtained by the computation circuit 211B are stored in the coefficient memory 212.

Although a processing apparatus for it is not shown, the processing in the apparatus 200B for producing the coefficient seed data shown in FIG. 18 can also be performed by software. A processing procedure in this case is roughly the same as that for coefficient data production processing shown in FIG. 12.

However, corresponding to an HD signal as a teacher signal input at step ST32, SD signals as student signals which have frequency characteristics and noise-added quantities corresponding to all combinations of values of the parameter r and z are produced and each used to perform learning processing at step ST34.

At step ST40, the process performs supplementation to obtain a normal equation given in Equation (16) for each class by using the class code Ca acquired at step ST38, pixel data xi of the prediction tap extracted at step ST39, items of pixel data (items of teacher data) $y_1$ to $y_4$ of the HD signal input at step ST32 corresponding to a target position in the SD signal, and the parameters r and z (see Equations (14) and (15)).

Further, at step ST42, instead of calculating the coefficient data Wi, the process obtains items of coefficient seed data $w_{i0}$ to $w_{i9}$ of each class by solving the normal equation produced by the above-described supplementation processing at step ST40 and, at step ST43, saves these items of coefficient seed data $w_{i0}$ to $w_{i9}$ in the coefficient memory and ends at step ST44.

Figure 19:
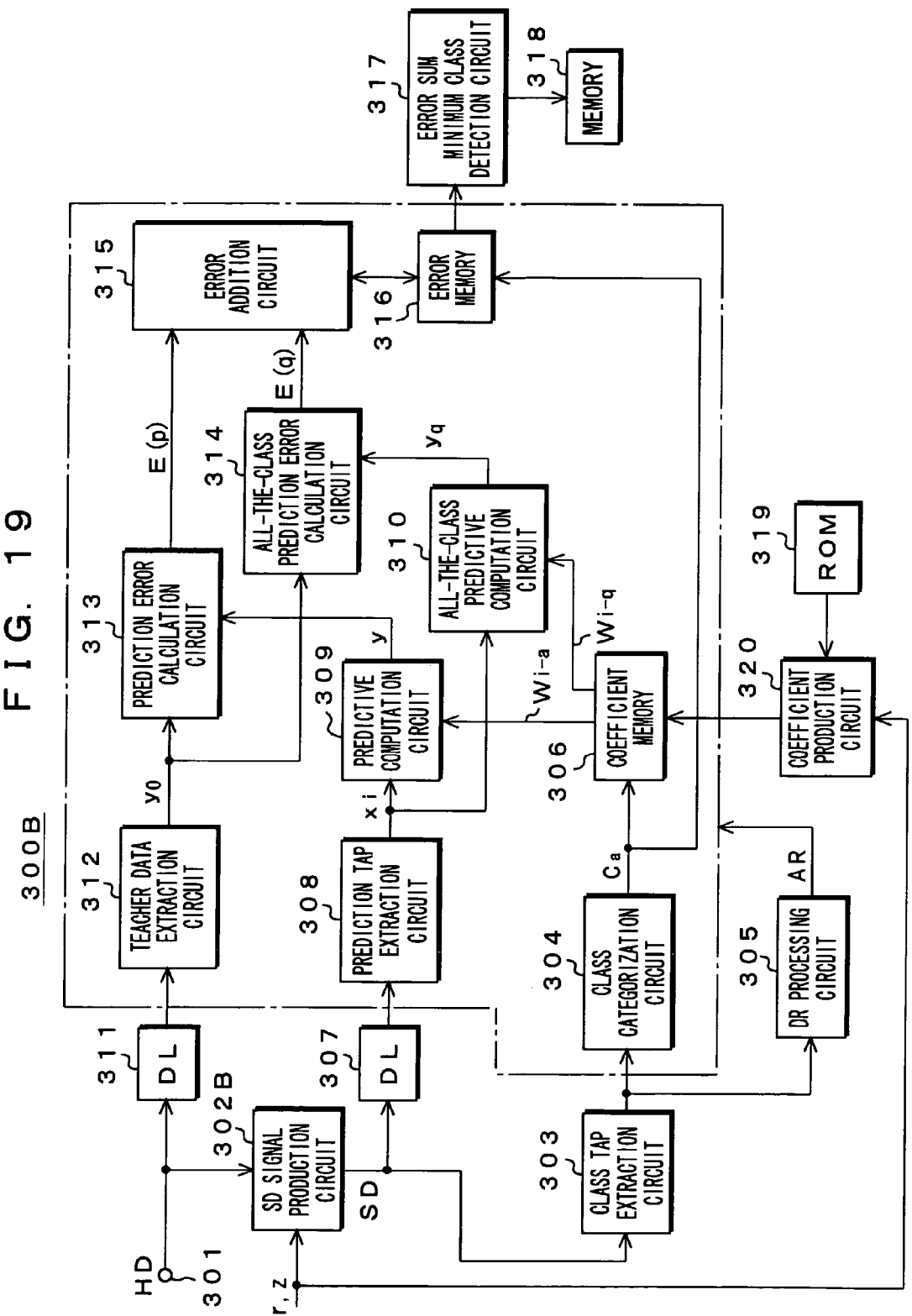
FIG. 19 is a block diagram showing a configuration of an apparatus for producing a lookup table.

FIG. 19 shows a configuration of a LUT production apparatus 300B for producing a correspondence relationship between a class code Ca and a class code Cb in the lookup table 105 shown in FIG. 16. In this FIG. 19, the components that correspond to those in FIG. 7 are indicated by the same symbols and their detailed explanation will be omitted.

The LUT production apparatus 300B comprises an SD signal production circuit 302B for obtaining an SD signal as a student signal (first learning signal) by performing horizontal and vertical thinning processing on an HD signal as a teacher signal (second learning signal) input to the input terminal 301. This SD signal production circuit 302B is supplied with the parameters r and z as the control signal. In accordance with the parameter r, frequency characteristics of the thinning filter used to produce the SD signal from the HD signal are varied. In accordance with the parameter z, the quantity of noise to be added to the SD signal is varied.

The LUT production apparatus 300B further comprises an ROM 319 for storing items of coefficient seed data $w_{i0}$ to $w_{i9}$ of each class. This coefficient seed data is coefficient data of a production equation for producing items of coefficient data Wi (i=1 to n) to be stored in the coefficient memory 306. This ROM 319 corresponds to the ROM 112 in the apparatus 100B for processing the image signal of FIG. 16 and stores the same coefficient seed data as that stored in this ROM 112.

The LUT production apparatus 300B further comprises a coefficient production circuit 320 for producing coefficient data Wi, which is used in an estimate equation and corresponds to values of the parameters r and z for each combination of classes and output pixel positions based on the above-described Equation (9) by using the coefficient seed data of each class and the values of the parameters r and z. Into this coefficient production circuit 320, items of coefficient seed data $w_{i0}$ to $w_{i9}$ are loaded from the ROM 319. Further, this coefficient production circuit 113 is supplied with the parameters r and z provided to the SD signal production circuit 302B.

The production of coefficient data Wi in this coefficient production circuit 320 is performed each time the values of the parameters r and z are changed. The coefficient data Wi of each class produced in this coefficient production circuit 320 is stored in the above-described coefficient memory 306.

The components of the LUT production apparatus 300B are configured the same way as those of the LUT production apparatus 300 shown in FIG. 7.

The following will describe operations of the LUT production apparatus 300B shown in FIG. 19.

Horizontal and vertical thinning processing is performed by the SD signal production circuit 302B on an HD signal input to the input terminal 301, to produce an SD signal as a student signal. In this case, the SD signal production circuit 302B is supplied with the parameters r and z as the control signal, to serially produce a plurality of SD signals having step-wise changed frequency characteristics and added-noise quantities. The SD signals produced by this SD signal production circuit 302B are supplied to the class tap extraction circuit 303 and also, via the time-adjusting delay circuit 307, to the prediction tap extraction circuit 308.

The parameters r and z same as those supplied to the SD signal production circuit 302B are supplied also to the coefficient production circuit 320. In this coefficient production circuit 320, each time the values of the parameters r and z are changed, coefficient data Wi of each class corresponding to these values of the parameters r and z is produced. Then, this coefficient data Wi is stored in the coefficient memory 306.

The other circuits operate the same way as those in the LUT production apparatus 300 shown in FIG. 7. Therefore, in the error memory 316, an accumulated value is stored of each output class at each of the input classes obtained on the basis of the HD signal input to the input terminal 301 and each of the SD signals produced by the SD signal production circuit 302B.

Then, in the error minimum class detection circuit 317, based on an accumulated value of each output class at each of the input classes, which is stored in the error memory 316, an output class in which the accumulated value is minimizes is allocated to each of the input classes, to acquire a correspondence relationship (see FIG. 4) between the class codes Ca and Cb, and this correspondence relationship is stored in the memory 318.

Further, although a processing apparatus for it is not shown, the processing in the LUT production apparatus 300B of FIG. 19 can also be realized by software. A processing procedure in this case is roughly the same as that for the LUT production processing shown in FIG. 13.

However, corresponding to the HD signal as a teacher signal input at step ST52, SD signals as student signals which have frequency characteristics and noise-added quantities corresponding to all combinations of values of the parameter r and z are produced and each used to perform processing to obtain an accumulated value of each output class at each of the input classes at step ST54.

Further, in that processing, at step ST60, items of coefficient seed data $w_{i0}$ to $w_{i9}$ that correspond to the class code Ca acquired at step ST58 and values of the parameters r and z that correspond to the SD signal at step ST54 are used to produce coefficient data Wi-a based on a production equation of the above-described Equation (9), and this coefficient data Wi-a is then used to calculate an error E $(p)=y_0-y$.

Similarly, at step ST62, items of coefficient seed data $w_{i0}$ to $w_{i9}$ that correspond to the class number q and values of the parameters r and z that correspond to the SD signal produced at step ST54 are used to produce coefficient data Wi-q based on a production equation of the above-described Equation (9), and this coefficient data Wi-q is then used to calculate an error E $(q)=y_0-y_q$.

At step ST67, based on an accumulated value of each output class at each of the input classes obtained by using each SD signal, an output class in which the accumulated value is minimized is allocated to each of the input classes, to acquire a correspondence relationship (see FIG. 4) between the class codes Ca and Cb.

Although detailed description will be omitted, such a configuration may be thought of that in the above-described apparatus 100A for processing the image signal shown in FIG. 14, items of coefficient data Wis and Wic to be stored in its coefficient memory 106A are produced on the basis of a production equation of Equation (9) from items of the coefficient seed data $w_{i0}$ to $w_{i9}$ and values of the parameters r and z like coefficient data Wi to be stored in the coefficient memory 106 in the apparatus 100B for processing the image signal shown in FIG. 16.

Further, although in the above-described embodiments, the parameter r that determines resolution and the parameter z that determines a degree of noise rejection have been included in the production equation of Equation (9), the kinds and the number of the parameters are not limited to them.

Further, in the above-described apparatus 100 for processing the image signal shown in FIG. 1 and the above-described apparatus 100B for processing the image signal shown in FIG. 16, if the area information AR is "1", that is, the dynamic range DR is less than a threshold value Th, addition mean value $(y_{1-a}+y_{1-b})/2$ through $(y_{4-a}+y_{4-b})/2$ of items of the pixel data $y_{1-a}$ to $y_{4-a}$ calculated by using the coefficient data Wi-a obtained corresponding to the class code Ca obtained on the basis of the class tap and items of the pixel data $y_{1-b}$ to $y_{4-b}$ calculated by using the coefficient data Wi-b obtained corresponding to the class code Cb obtained by converting this class code Ca are output as items of pixel data $y_1$ to $y_4$ that constitute the HD signal.

However, the number of classes to be subject to addition mean is not limited to two; such the addition mean may be considered to be performed on three or more classes and a result one is output. For example, when the addition mean is performed on three classes, a class code that indicates the third class can be obtained by obtaining an addition mean value $(y_a+y_b)/2$ of the two classes at the predictive computation circuit 309 and obtaining the error E (p) by subtracting the addition mean value $(y_a+y_b)/2$ from the teacher data $y_0$ at the prediction error calculation circuit 313. It is thus possible to allocate an output class corresponding to each of the input classes (two classes) at the error minimum class detection circuit 317, thereby obtaining the third class code that corresponds to this output class.

Further, in the above-described apparatus 100 for processing the image signal shown in FIG. 1 and the above-described apparatus 100B for processing the image signal shown FIG. 16, if DR≧Th, items of pixel data $y_{1-a}$ to $y_{4-a}$ calculated by using coefficient data Wi-a corresponding to a class code Ca have been output as items of pixel data $y_1$ to $y_4$ that constitute an HD signal and, if DR<Th, an addition mean value $(y_{1-a}+y_{1-b})/2$ through $(y_{4-a}+y_{4-b})/2$ of items of pixel data $y_{1-a}$ to $y_{4-a}$ and $y_{1-b}$ to $y_{4-b}$ calculated by using items of coefficient data Wi-a and Wi-b corresponding to the class codes Ca and Cb, respectively, have been output as items of pixel data $y_1$ to $y_4$ that constitute the HD signal.

However, the operations in a case where DR≧Th and those in a case where DR<Th may be considered to be made opposite. In this case, coefficient data Wi to be stored in the coefficient memory 106 is supposed to be based on a result of learning between a student signal that corresponds to the SD signal and a teacher signal that corresponds to the HD signal by use of such a portion of the dynamic range DR as to be smaller than the threshold value Th. It is to be noted that the operation in the cases of DR≧Th and DR<Th can be made opposite similarly also in the apparatus 100A for processing the image signal shown in FIG. 14.

Further, in the above-described embodiments, a possible area of the dynamic range has been divided into two by using a threshold value Th beforehand; and if DR≧Th, "0" may be output as the area information, and if DR<Th, "1" may be output as the area information AR.

However, it may be considered that by dividing the possible area of the dynamic range DR into three or more to acquire area information AR that indicates which one of these sub-divided areas the dynamic range DR belongs to so that processing may be performed in accordance with this area information AR. In this case, for example, if the dynamic range DR belongs to one sub-divided area, the same processing as the above-described processing in the case of DR≧Th is to be performed, whereas if the dynamic range DR belongs to another sub-divided area different from that one sub-divided area, the same processing as the above-described processing in the case of DR<Th is to be performed.

Further, although the above embodiments have been described with reference to an example of converting an SD signal into an HD signal having twice the number of pixels horizontally and vertically, a direction in which the number of pixels is increased is not limited to the horizontal and vertical directions and may be considered to be a time direction (frame direction). Also to the case of, oppositely, obtaining an SD signal having a decreased number of pixels from an HD signal, the present invention can be applied similarly. That is, the present invention can be applied generally to the case of converting a first image signal into a second image signal that has the same number of pixels as or a different number of pixels from that of this first image signal.

Further, although the above embodiments have been described with reference to an example where an information signal comprised of multiple items of information data is an image signal comprised of multiple items of pixel data, the present invention can be similarly applied to a case where the information signal is any other signal, for example, an audio signal. In the case of an audio signal, it is comprised of multiple items of sample data.

By the present invention, when converting a first information signal comprised of multiple items of information data into a second information signal comprised of multiple items of information data, multiple items of information data located in a periphery of a target position in the first information signal is extracted as a class tap and, if a dynamic range obtained from information data in this class tap belongs to one area, information data that constitutes the second information signal is obtained by using coefficient data that corresponds to a first class code obtained by class-categorizing that class tap based on a result of learning between a student signal (first learning signal) and a teacher signal (second learning signal) by use of such a portion of the dynamic range as to belong to that one area, and if the dynamic range belongs another area different from that one area, information data that constitutes the second information signal is obtained by performing addition mean on information data calculated by using coefficient data that corresponds to the first class code and information data calculated by using coefficient data that corresponds to a second class code obtained by converting this first class code, so that it is possible to well obtain information data that constitutes the second information signal no matter whether the dynamic range is large or small.

Further, by the present invention, when converting a first information signal comprised of multiple items of information data into a second information signal comprised of multiple items of information data, multiple items of information data located in a periphery of a target position in the first information signal is extracted as a class tap and, if a dynamic range obtained from information data in this class tap belongs to one area, information data that constitutes the second information signal is obtained by using coefficient data that corresponds to a first class code obtained by class-categorizing the class tap based on a result of learning between a student signal (first learning signal) and a teacher signal (second learning signal) by use of such a portion of the dynamic range as to belong to that one area, and if the dynamic range belongs to another area other than that one area, information data that constitutes the second information signal is obtained by using coefficient data based on a result of learning between the student signal and the teacher signal without class categorization, so that it is possible to well obtain information data that constitutes the second information signal no matter whether the dynamic range is large or small.

INDUSTRIAL APPLICABILITY

When converting a first information signal into a second information signal, an apparatus for processing an information signal etc. related to the present invention can well obtain information data that constitutes the second information signal no matter whether a dynamic range is large or small and so can be applied, for example, to the case of converting a standard TV signal (SD signal) corresponding to a standard or low resolution into a high-resolution signal (HD signal).

The invention claimed is:

1. An apparatus for converting a first information signal of standard definition comprised of multiple items of information data into a second information signal of high definition image data comprised of multiple items of information data, the apparatus comprising:
 class tap extraction means for extracting as a class tap multiple items of information data located in a periphery of a target position in the first information signal based on the first information signal;
 class categorization means for obtaining a first class code by categorizing the class tap extracted by the class tap extraction means as any one of a plurality of classes based on the class tap;
 dynamic range processing means for detecting a dynamic range which is a difference between a maximum value and a minimum value of the multiple items of information data contained in the class tap extracted by the class tap extraction means based on the class tap, to obtain area information that indicates which one of a plurality of sub-divided areas obtained by dividing a possible area of the dynamic range into plural ones the dynamic range belongs to;

class code conversion means for converting the first class code obtained by the class categorization means into one or a plurality of second class codes each corresponding to the first class code;

prediction tap extraction means for extracting as a prediction tap multiple items of information data located in a periphery of the target position in the first information signal based on the first information signal;

first coefficient data generation means for generating first coefficient data, which is used in an estimate equation corresponding to the first class code obtained by the class categorization means;

second coefficient data generation means for generating second coefficient data, which is used in the estimate equation, corresponding to one or the plurality of second class codes, respectively, obtained through conversion by the class code conversion means;

first computation means for calculating information data based on the estimate equation, by using the first coefficient data generated by the first coefficient data generation means and the prediction tap extracted by the prediction tap extraction means;

second computation means for calculating information data based on the estimate equation, by using the second coefficient data generated by the second coefficient data generation means and the prediction tap extracted by the prediction tap extraction means; and addition means for outputting the information data calculated by the first computation means as information data that constitutes the second information signal corresponding to a target position in the first information signal if the dynamic range belongs to one sub-divided area according to the area information obtained by the dynamic range processing means and, if the dynamic range belongs to another sub-divided area different from the one sub-divided area, outputting data obtained by performing addition mean on the information data calculated by the first computation means and that calculated by the second computation means as the information data that constitutes the second information signal corresponding to the target position in the first information signal, wherein the first coefficient data generated by the first coefficient data generation means and the second coefficient data generated by the second coefficient data generation means are based on a result of learning between a first learning signal that corresponds to the first information signal and a second learning signal that corresponds to the second information signal by use of such a portion of the dynamic range as to belong to the one sub-divided area; and wherein the class code conversion means converts the first class code into the second class code in such a manner that the addition mean value of the information data calculated by the first computation means corresponding to the first class code and the information data calculated by the second computation means corresponding to the second class code may most approach a true value of the information data that constitutes the second information signal.

2. The apparatus for processing the information signal according to claim 1, wherein the dynamic range processing means obtains area information that indicates whether the dynamic range is less than a threshold value or not less than the threshold value.

3. The apparatus for processing the information signal according to claim 2, wherein if the dynamic range is not less than the threshold value, the addition means outputs information data obtained by the first computation means as information data that constitutes the second information signal corresponding to a target position in the first information signal and, if the dynamic range is less than the threshold value, outputs data obtained by performing addition mean on information data obtained by the first computation means and that obtained by the second computation means as information data that constitutes the second information signal corresponding to the target position in the first information signal.

4. The apparatus for processing the information signal according to claim 1, wherein the first coefficient data generation means and the second coefficient data generation means each comprise:

storage means for storing coefficient data which is obtained beforehand and which is used in the estimate equation of each class; and coefficient data reading means for reading coefficient data that corresponds to a class indicated by a class code from the storage means.

5. The apparatus for processing the information signal according to claim 1, wherein the first coefficient data generation means and the second coefficient data generation means each comprise:

storage means for storing coefficient seed data that is obtained beforehand for each class and is coefficient data in a production equation, which includes a predetermined parameter, for producing coefficient data to be used in the estimate equation; and coefficient data production means for producing coefficient data to be used in the estimate equation based on the production equation by using the coefficient seed data corresponding to a class indicated by a class code stored in the storage means.

6. The apparatus for processing the information signal according to claim 1, wherein the class code conversion means is configured by a lookup table in which a correspondence relationship between the first class code and the second class code is stored.

7. The apparatus for processing the information signal according to class 1, wherein the information signal is an image signal or an audio signal.

8. An image quality improvement method executed by a processor for converting a first information signal of standard definition comprised of multiple items of information data into a second information signal of high definition image data comprised of multiple items of information data, the method comprising:

a class tap extraction step of extracting as a class tap multiple items of information data located in a periphery of a target position in the first information signal based on the first information signal;

a class categorization step of obtaining a first class code by categorizing the class tap extracted by the class tap extraction step as any one of a plurality of classes based on the class tap;

a dynamic range processing step of detecting a dynamic range which is a difference between a maximum value and a minimum value of the multiple items of information data contained in the class tap extracted by the class tap extraction step based on the class tap, to obtain area information that indicates which one of a plurality of sub-divided areas obtained by dividing a possible area of the dynamic range into plural ones the dynamic range belongs to;

a class code conversion step of converting a first class code obtained by the class categorization step into one or a plurality of second class codes each corresponding to the first class code;

a prediction tap extraction step of extracting as a prediction tap multiple items of information data located in a periphery of the target position in the first information signal based on the first information signal;

a first coefficient data generation step of generating first coefficient data, which is used in an estimate equation corresponding to the first class code obtained by the class categorization step;

a second coefficient data generation step of generating second coefficient data, which is used in the estimate equation, corresponding to one or the plurality of second class codes, respectively, obtained through conversion by the class code conversion step;

a first computation step of calculating information data based on the estimate equation, by using the first coefficient data generated by the first coefficient data generation step and the prediction tap extracted by the prediction tap extraction step;

a second computation step of calculating information data based on the estimate equation, by using the second coefficient data generated by the second coefficient data generation step and the prediction tap extracted by the prediction tap extraction step; and an addition step of outputting the information data calculated by the first computation step as information data that constitutes the second information signal corresponding to a target position in the first information signal if the dynamic range belongs to one sub-divided area according to the area information obtained by the dynamic range processing step and, if the dynamic range belongs to another sub-divided area different from the one sub-divided area, outputting data obtained by performing addition mean on the information data calculated by the first computation step and that calculated by the second computation step as the information data that constitutes the second information signal corresponding to the target position in the first information signal, wherein the first coefficient data generated by the first coefficient data generation step and the second coefficient data generated by the second coefficient data generation step are based on a result of learning between a first learning signal that corresponds to the first information signal and a second learning signal that corresponds to the second information signal by use of such a portion of the dynamic range as to belong to the one sub-divided area; and wherein in the class code conversion step, the first class code is converted into the second class code in such a manner that the addition mean value of the information data calculated by the first computation step corresponding to the first class code and the information data calculated by the second computation step corresponding to the second class code may most approach a true value of the information data that constitutes the second information signal.

9. A non-transitory recording medium on which a computer-readable program is recorded, the program causing a computer to perform an image quality improvement method, executed by a processor, for converting a first information signal of standard definition comprised of multiple items of information data into a second information signal of high definition image data comprised of multiple items of information data, the method comprising:

a class tap extraction step of extracting as a class tap multiple items of information data located in a periphery of a target position in the first information signal based on the first information signal;

a class categorization step of obtaining a first class code by categorizing the class tap extracted by the class tap extraction step as any one of a plurality of classes based on the class tap;

a dynamic range processing step of detecting a dynamic range which is a difference between a maximum value and a minimum value of the multiple items of information data contained in the class tap extracted by the class tap extraction step based on the class tap, to obtain area information that indicates which one of a plurality of sub-divided areas obtained by dividing a possible area of the dynamic range into plural ones the dynamic range belongs to;

a class code conversion step of converting a first class code obtained by the class categorization step into one or a plurality of second class codes each corresponding to the first class code;

a prediction tap extraction step of extracting as a prediction tap multiple items of information data located in a periphery of the target position in the first information signal based on the first information signal;

a first coefficient data generation step of generating first coefficient data, which is used in an estimate equation corresponding to the first class code obtained by the class categorization step;

a second coefficient data generation step of generating second coefficient data, which is used in the estimate equation, corresponding to one or the plurality of second class codes, respectively, obtained through conversion by the class code conversion step;

a first computation step of calculating information data based on the estimate equation, by using the first coefficient data generated by the first coefficient data generation step and the prediction tap extracted by the prediction tap extraction step;

a second computation step of calculating information data based on the estimate equation, by using the second coefficient data generated by the second coefficient data generation step and the prediction tap extracted by the prediction tap extraction step; and an addition step of outputting the information data calculated by the first computation step as information data that constitutes the second information signal corresponding to a target position in the first information signal if the dynamic range belongs to one sub-divided area according to the area information obtained by the dynamic range processing step and, if the dynamic range belongs to another sub-divided area different from the one sub-divided area, outputting data obtained by performing addition mean on the information data calculated by the first computation step and that calculated by the second computation step as the information data that constitutes the second information signal corresponding to the target position in the first information signal, wherein the first coefficient data generated by the first coefficient data generation step and the second coefficient data generated by the second coefficient data generation step are based on a result of learning between a first learning signal that corresponds to the first information signal and a second learning signal that corresponds to the second information signal by use of such a portion of the dynamic range as to belong to the one sub-divided area; and wherein in the class code conversion step, the first class code is converted into the second class code in such a manner that the addition mean value of the information data calculated by the first computation step corresponding to the first class code and the information data calculated by the second computation step corresponding to the second class code may most approach a true value of the information data that constitutes the second information signal.

* * * * *